(12) United States Patent
Luo et al.

(10) Patent No.: US 11,352,748 B2
(45) Date of Patent: Jun. 7, 2022

(54) CROSSLINKED PULPS, CELLULOSE ETHER PRODUCTS MADE THEREFROM; AND RELATED METHODS OF MAKING PULPS AND CELLULOSE ETHER PRODUCTS

(71) Applicant: INTERNATIONAL PAPER COMPANY, Memphis, TN (US)

(72) Inventors: Mengkui Luo, Federal Way, WA (US); Michael Rea, Vancouver, WA (US); Angela Dodd, Seattle, WA (US); Andrew Dodd, Seattle, WA (US); Amy Anderson-Gaber, Kent, WA (US); Kris Lindenauer, Auburn, WA (US); Hugh West, Seattle, WA (US); Charles Miller, Federal Way, WA (US)

(73) Assignee: INTERNATIONAL PAPER COMPANY, Memphis, TN (US)

( * ) Notice: Subject to any disclaimer, the term of this patent is extended or adjusted under 35 U.S.C. 154(b) by 582 days.

(21) Appl. No.: 15/999,228

(22) Filed: Aug. 16, 2018

(65) Prior Publication Data
US 2020/0040525 A1 Feb. 6, 2020

Related U.S. Application Data

(60) Provisional application No. 62/712,844, filed on Jul. 31, 2018.

(51) Int. Cl.
| | |
|---|---|
| *D21H 11/20* | (2006.01) |
| *D21H 11/04* | (2006.01) |
| *C08B 11/00* | (2006.01) |
| *D21H 11/12* | (2006.01) |
| *D21C 9/00* | (2006.01) |

(Continued)

(52) U.S. Cl.
CPC .............. *D21C 9/004* (2013.01); *C08B 11/00* (2013.01); *D21H 11/04* (2013.01); *D21H 11/12* (2013.01); *D21H 11/20* (2013.01); *D21H 15/04* (2013.01); *D21H 15/10* (2013.01)

(58) Field of Classification Search
CPC ........ D21H 11/04; D21H 11/12; D21H 11/20; D21H 15/04; D21H 15/10; D21C 9/004; C08L 1/02; C08B 11/00
See application file for complete search history.

(56) References Cited

U.S. PATENT DOCUMENTS

| | | | |
|---|---|---|---|
| 3,069,311 A | 12/1962 | Harpham et al. | |
| 3,658,613 A | 4/1972 | Steiger | |
| 3,700,549 A | 10/1972 | Croon et al. | |

(Continued)

FOREIGN PATENT DOCUMENTS

| | | |
|---|---|---|
| CA | 2 529 274 A1 | 6/2006 |
| CN | 102887956 | 1/2013 |

(Continued)

OTHER PUBLICATIONS

Roy et al, Cellulose Modification by polymer grafting: a review, May 1, 2009, RSC Publishing (Year: 2009).*

(Continued)

*Primary Examiner* — Eric Hug
*Assistant Examiner* — Elisa H Vera
(74) *Attorney, Agent, or Firm* — Thomas W. Barnes, III; Andrew L. Laughlin

(57) ABSTRACT

Pulps, cellulose ether products, and methods of making pulps are described.

13 Claims, 4 Drawing Sheets

(51) Int. Cl.
*D21H 15/10* (2006.01)
*D21H 15/04* (2006.01)

(56) References Cited

U.S. PATENT DOCUMENTS

| | | | |
|---|---|---|---|
| 3,932,209 A * | 1/1976 | Chatterjee | A61L 15/28 162/157.6 |
| 4,295,925 A | 10/1981 | Bentvelzen et al. | |
| 4,295,926 A | 10/1981 | Bentvelzen et al. | |
| 4,295,927 A | 10/1981 | Bentvelzen et al. | |
| 4,298,426 A | 11/1981 | Torregrossa et al. | |
| 4,889,595 A * | 12/1989 | Herron | D06M 13/127 162/157.6 |
| 5,179,021 A | 1/1993 | du Manoir et al. | |
| 5,324,391 A | 6/1994 | Carney | |
| 5,366,591 A | 11/1994 | Jewel | |
| 5,384,012 A | 1/1995 | Hazard, Jr. | |
| 5,437,418 A | 8/1995 | Graef | |
| 5,779,857 A | 7/1998 | Norlander | |
| 6,176,973 B1 | 1/2001 | Norlander | |
| 6,531,593 B1 | 3/2003 | Lui | |
| 6,685,856 B2 | 2/2004 | Sealey, II et al. | |
| 7,541,396 B2 | 6/2009 | Luo et al. | |
| 7,604,714 B2 | 10/2009 | Luo et al. | |
| 8,039,683 B2 | 10/2011 | Qin et al. | |
| 8,722,797 B2 | 5/2014 | Stoyanov et al. | |
| 8,845,757 B2 | 9/2014 | Weinstein | |
| 9,771,687 B2 | 9/2017 | Luo | |
| 9,828,725 B1 | 11/2017 | Hamed et al. | |
| 9,926,665 B2 | 3/2018 | Luo | |
| 9,970,158 B2 | 5/2018 | Nonni | |
| 2002/0088581 A1 | 7/2002 | Graef et al. | |
| 2002/0155292 A1 | 10/2002 | Sealey, II et al. | |
| 2003/0186053 A1 | 10/2003 | Sealey, II et al. | |
| 2004/0074616 A1 | 4/2004 | Sears et al. | |
| 2005/0223501 A1 | 10/2005 | Stoyanov et al. | |
| 2006/0118255 A1 | 6/2006 | Sears et al. | |
| 2006/0142480 A1 | 6/2006 | Luo et al. | |
| 2006/0142481 A1 | 6/2006 | Herriott et al. | |
| 2006/0142561 A1 | 6/2006 | Luo et al. | |
| 2006/0229393 A1 | 10/2006 | Duggirala | |
| 2008/0082064 A1 | 4/2008 | Luo et al. | |
| 2008/0082068 A1 | 4/2008 | Qin et al. | |
| 2008/0147032 A1 | 6/2008 | Luo et al. | |
| 2008/0147033 A1 | 6/2008 | Luo et al. | |
| 2009/0099541 A1 * | 4/2009 | Qin | A61F 13/53 604/376 |
| 2009/0199349 A1 | 8/2009 | Weinstein | |
| 2010/0162542 A1 | 6/2010 | Luo et al. | |
| 2010/0167018 A1 | 6/2010 | Luo et al. | |
| 2011/0077354 A1 | 3/2011 | Stoyanov et al. | |
| 2013/0012696 A1 | 1/2013 | Adden | |
| 2017/0247833 A1 | 8/2017 | Lou | |
| 2018/0187372 A1 | 7/2018 | Luo | |
| 2018/0363245 A1 | 12/2018 | Luo | |
| 2019/0242060 A1 | 8/2019 | Luo et al. | |
| 2020/0002891 A1 | 1/2020 | Luo | |
| 2020/0040525 A1 | 2/2020 | Luo | |

FOREIGN PATENT DOCUMENTS

| | | |
|---|---|---|
| EP | 0399564 B2 | 5/1990 |
| EP | 1 676 865 A1 | 7/2006 |
| JP | 581701 A | 1/1983 |
| JP | 61157501 A | 7/1986 |
| WO | 98/30387 A1 | 7/1998 |
| WO | 2005/035871 A2 | 4/2005 |
| WO | 2009/088635 A2 | 7/2009 |
| WO | 2015/165588 A1 | 11/2015 |
| WO | 2017/147496 A1 | 8/2017 |
| WO | 2018/144309 A1 | 8/2018 |

OTHER PUBLICATIONS

Mishra et al, Synthesis and Applicaitons of Grafted Carboxymethyl Cellulose A Review, 2015, as a part of Cellulose-Based graft copolymers: structure and chemistry edited by Vijay Kumar Thakur, CRC Press (Year: 2015).*
First Office Action and Search Report dated Aug. 18, 2020, in Chinese Patent Application No. 2017800243151, filed Feb. 24, 2017, with English translation, 31 pages.
International Search Report and Written Opinion dated Mar. 12, 2020, in PCT/US2019/044344, filed Jul. 31, 2019, 11 pages.
Australian Office Action (Examination Report No. 1) dated Aug. 9, 2019, in Australian Application No. 201910613, filed Feb. 24, 2017, 2019, 4 pages.
Australian Office Action (Examination Report No. 2) dated Oct. 3, 2019, in Australian Application No. 201910613, filed Feb. 24, 2017, 2019, 4 pages.
International Search Report and Written Opinion dated Aug. 10, 2017, in corresponding International Application No. PCT/US2017/019457, filed Feb. 24, 2017, 13 pages.
Lionetto, F., et al., "Monitoring Wood Degradation During Weathering by Cellulose Crystallinity," Materials 5(10):1910-1922, Oct. 2012.
Nicholson, M.D., and F.M. Merrit, "Cellulose Ethers," in Nevell, T.P., and S. Zeronian (eds), "Cellulose Chemistry and its Applications," Halsted (Wiley), New York, 1985, pp. 363-383.
International Preliminary Report on Patentability dated Sep. 7, 2018, in corresponding International Application No. PCT/US2017/019457, filed Feb. 24, 2017, 8 pages.
Australian Office Action dated Oct. 17, 2018, in Auslialian Application No. 2017223978, filed Feb. 24, 2017, 5 pages.
Australian Office Action dated May 22, 2019, in Auslialian Application No. 2017223978, filed Feb. 24, 2017, 5 pages.
Australian Office Action dated Sep. 20, 2019, in Auslialian Application No. 201910574, filed Jul. 31, 2019, 6 pages.
Sixta, H., "Handbook of Pulp," Wiley-VCH Verlag GmbH & Co. KGaA, Weinheim, Germany, c. 2006.

* cited by examiner

CROSSLINKED PULPS, CELLULOSE ETHER PRODUCTS MADE THEREFROM; AND RELATED METHODS OF MAKING PULPS AND CELLULOSE ETHER PRODUCTS

CROSS-REFERENCE TO RELATED APPLICATION

This application claims the benefit of U.S. Application No. 62/712,844, filed on Jul. 31, 2018, the contents of which are incorporated herein by reference.

TECHNICAL FIELD

The present disclosure is related to cellulose products (e.g., pulp) and cellulose derivatives (e.g., cellulose ethers) and related methods of making cellulose products.

BACKGROUND

Cellulose ethers (e.g., carboxymethyl cellulose, methyl cellulose, hydroxylethyl cellulose, etc.) form aqueous solutions and are available in various grades depending, in large part, on the viscosity of these solutions. High-grade cellulose ethers that form more-viscous aqueous solutions tend to be more valuable than lower-grade cellulose ethers that form less-viscous aqueous solutions under the same conditions (concentration, temperature, etc.). The capacity of a given cellulose ether to form a more-viscous aqueous solution is closely related to the degree of polymerization, crosslinking, and/or other properties of the cellulose precursor from which the given cellulose ether is produced. High-grade cellulose ether is conventionally produced from dissolving-grade pulp (e.g., high-viscosity wood pulp and high-viscosity cotton linters pulp (CLP)), while medium-grade and low-grade cellulose ether is conventionally produced from lower-cost wood pulps. Pulp grades referenced in this disclosure are further discussed in Herbert Sixta, Handbook of Pulp, Wiley-Vch (2006), which is incorporated herein by reference in its entirety. The degree of polymerization of most wood pulps typically does not exceed about 1,500. In contrast, dissolving-grade pulp often has a degree of polymerization of 2,400 or greater. Unfortunately, dissolving-grade pulp tends to be expensive. Prior attempts to modify low-cost pulps for production of high-grade cellulose derivatives have had only limited success.

Several conventional processes have, to some degree, been successful in increasing the capacity of kraft pulp to produce cellulose ethers that form high-viscosity aqueous solutions. Unfortunately, these conventional processes have done so at the expense of other desirable properties in cellulose ethers derived therefrom and/or at the expense of process yields. For example, some conventional processes include increasing removal of hemicellulose from kraft pulp. These processes, however, have low yields due to removal of the mass that hemicellulose provides. Moreover, the pulps resulting from these processes tend to have low reactivity due to conversion of constituent cellulose from cellulose-I to cellulose-II. Conventional crosslinking reactions also typically reduce the reactivity of a pulp. Even allowing for low yield and/or low reactivity, conventional processes for modifying low-cost pulp have still not been able to produce pulp suitable for producing cellulose ethers that form aqueous solutions with viscosities as high as those of cellulose derivatives produced from high-viscosity, dissolving-grade ether pulps.

Crosslinking cellulose at moderate consistency has been attempted to produce moderately high viscosity pulp. Such moderate-consistency may include crosslinking at consistencies less than, for example 20% or less than 30%. Such processes are limited by conventional processes system in the existing pulp mill. A process, especially a low cost process, producing a pulp product with high value (e.g. high ether viscosity and viscosity consistency) has not been investigated. As is also discussed further herein, a quality product with consistent product quality is presently lacking.

Accordingly, there is a need for further innovation in this field. This is particularly so with respect to economically efficient methods of making crosslinked pulps and high-viscosity cellulose ether products made therefrom.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In an aspect the present disclosure provides a pulp comprising: crosslinked cellulose fibers, wherein the pulp has a pulp R18 value greater than or equal to 93%.

In an aspect the present disclosure provides a pulp comprising: crosslinked cellulose fibers, wherein the pulp has: a resultant carboxymethyl cellulose (CMC) viscosity coefficient of variability (COV) of less than 30%; and a pulp R18 value greater than 92%.

In an aspect the present disclosure provides a pulp comprising: crosslinked cellulose fibers, wherein the pulp has: a water retention value (WRV) in a range between 0.8 g/g and less than 1.0 g/g; and a pulp R18 value greater than 89%.

In an aspect the present disclosure provides a cellulose ether product comprising: a crosslinked cellulose ether having a viscosity greater than about 56 centipoise (cP); and formed from a pulp according to any of the embodiments of the present disclosure.

In an aspect the present disclosure provides a blended pulp comprising: a first pulp according to any of embodiments of the present disclosure having a first fiber kink value; and a second pulp having a second fiber kink value different from the first fiber kink value.

In an aspect the present disclosure provides a method of making a pulp, comprising: digesting a cellulosic feedstock to form a pulp; bleaching the pulp to form a bleached pulp; crosslinking cellulose fibers within the bleached pulp with a crosslinker to form a crosslinked pulp, wherein during crosslinking the bleached pulp has a consistency greater than 30%, and wherein an R18 value of the crosslinked pulp is greater than 92%; and drying the crosslinked pulp.

In an aspect the present disclosure provides a method of making a pulp, comprising: contacting wood fibers with a crosslinker and an alkaline hydroxide, wherein the wood fibers have a water content in a range of about 0 wt. % to about 50 wt. %; heating the wood fibers, the crosslinker, and the alkaline hydroxide to provide crosslinked wood fibers; and washing the crosslinked wood fibers to remove unreacted crosslinker; wherein an R18 value of the pulp after crosslinking is greater than or equal to 93%.

In an aspect the present disclosure provides a method of making a crosslinked cellulose pulp, comprising: activating a cellulosic pulp with an alkali hydroxide at a consistency of greater than 4% to provide an activated pulp; removing the alkali hydroxide from the activated pulp; and crosslinking the activated pulp with a crosslinker at a consistency of greater than 20% and at a temperature in a range of 30° C. to 95° C. to provide a crosslinked pulp.

In an aspect the present disclosure provides a pulp formed according to any of the methods of the present disclosure.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

Figure 1:
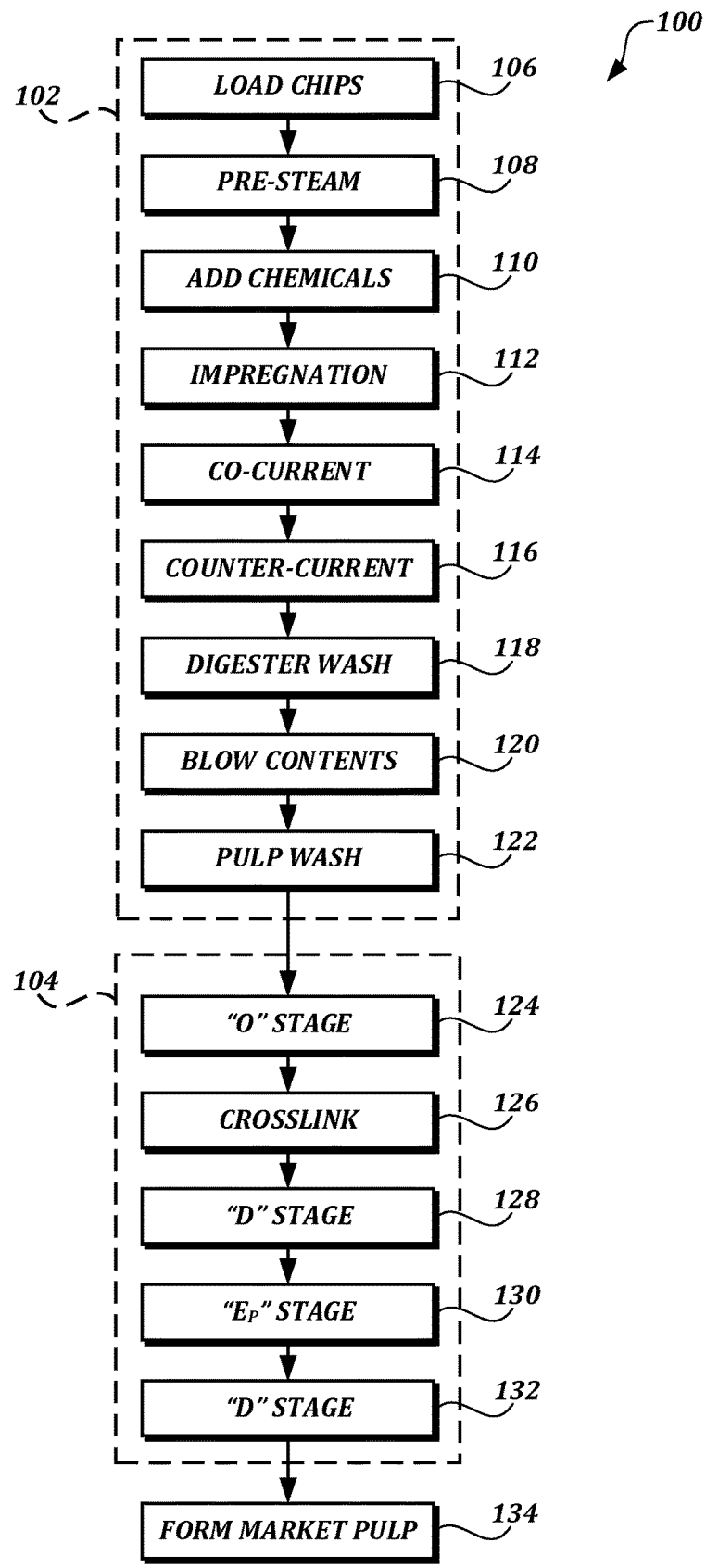
FIG. 1 is a schematic illustration of a method for making a pulp in accordance with an embodiment of the disclosure.

The present disclosure provides pulps, cellulose ether products, and methods of making pulps.

Methods of Making Crosslinked Pulps

In certain aspects, the present disclosure provides methods for making crosslinked pulps. As discussed further herein, the methods of the present disclosure are useful in making crosslinked pulps suitable for making high-viscosity crosslinked ether products in an economically efficient manner.

It should be understood, in general, that other methods, systems, and compositions in addition to those disclosed herein are within the scope of the present disclosure. For example, methods, systems, and compositions in accordance with embodiments of the present disclosure can have different and/or additional operations, components, configurations, etc. than those disclosed herein. Moreover, a person of ordinary skill in the art will understand that methods, systems, and compositions in accordance with embodiments of the present disclosure can be without certain operations, components, configurations, etc. disclosed herein without deviating from the present disclosure.

Modified Kraft Process Including High-Consistency Crosslinking

Methods for making crosslinked pulp and related systems and compositions in accordance with embodiments of the present disclosure can at least partially address one or more problems associated with conventional technologies whether or not such problems are stated herein. For example, methods in accordance with at least some embodiments of the present disclosure allow low-cost pulp to serve as a precursor in the production of high-grade cellulose ethers and/or other cellulose derivatives (e.g., cellulose esters). Kraft pulp, for example, is far less expensive and more widely available than certain dissolving-grade pulp. When standard kraft pulp is used as a precursor for production of cellulose ethers, however, the resulting cellulose ethers tend to be low grade.

In conventional kraft processing, pulp is maintained at relatively low consistency (e.g., a consistency less than or equal to 10%). As the consistency of pulp increases, it becomes more difficult to flow the pulp through pipes and to mix the pulp. Therefore, any crosslinking in conventional processes for modifying kraft pulp to increase its potential for production of high-grade cellulose derivatives has also been carried out at relatively low consistency.

As discussed further herein, it has been found that through the use of, for example, high-consistency mixers and other high-consistency methods that intimate mixing of, for example, cellulose, caustic, and crosslinkers can be achieved. Through intimate mixing of crosslinking reaction components, the methods of the present disclosure provide pulps suitable for making high-viscosity cellulose ether products in an economically efficient manner. Another of the surprising discoveries associated with at least some embodiments of the present disclosure is that increasing the consistency of pulp during crosslinking can increase the reactivity of the crosslinked pulp relative to certain crosslinked pulps having lower consistency during crosslinking.

With these and/or other discoveries associated with at least some embodiments of the present disclosure, it is now possible to produce kraft pulp that is a true substitute for and/or a suitable extender of expensive dissolving-grade pulp in production of high-grade, high-viscosity cellulose derivatives.

Methods in accordance with at least some embodiments of the present disclosure include crosslinking pulp at relatively high consistency (e.g., consistency greater than or equal to 20%, 30%, or higher). Accordingly, in an embodiment of the present disclosure, the method includes digesting a cellulosic feedstock to form a pulp; bleaching the pulp to form a bleached pulp; and crosslinking cellulose fibers within the bleached pulp with a crosslinker to form a cross linked pulp, wherein during crosslinking the bleached pulp has a consistency, for example, greater than 20%, greater than 25%, greater than 30%, or more.

In an embodiment, the methods described herein include a modified kraft process for making crosslinked pulps. Examples of suitable starting materials for making pulp, such as in a modified kraft process, in accordance with embodiments of the present disclosure include wood and recycled paper. In at least some embodiments, the starting material is never dried. In the wood pulping industry, trees are conventionally classified as either hardwood or softwood. Pulp for use as starting material can be derived from a softwood or hardwood tree species. Examples of suitable softwood tree species include fir (e.g., Douglas fir and balsam fir), pine (e.g., eastern white pine and loblolly pine), spruce (e.g., white spruce), larch (e.g., eastern larch), cedar, and hemlock (e.g., eastern and western hemlock). Examples of suitable hardwood species include acacia, alder (e.g., red alder and European black alder), aspen (e.g., quaking aspen), beech, birch, oak (e.g., white oak), gum trees (e.g., eucalyptus and sweetgum), poplar (e.g., balsam poplar, eastern cottonwood, black cottonwood, and yellow poplar), gmelina and maple (e.g., sugar maple, red maple, silver maple, and bigleaf maple).

Wood from softwood or hardwood species generally includes three major components: cellulose, hemicellulose, and lignin. Cellulose makes up about 50% of the woody structure of plants and is an unbranched polymer of D-glucose monomers. Individual cellulose polymer chains associate to form thicker microfibrils that, in turn, associate to form fibrils arranged into bundles. The bundles form fibers that are visible as components of the plant cell wall when viewed at high magnification under a light microscope or a scanning electron microscope. Cellulose is highly crystalline as a result of extensive intramolecular and intermolecular hydrogen bonding. Hemicellulose is a heterogeneous group of low molecular weight carbohydrate polymers such as xylan and mannan that are associated with cellulose in wood. Hemicelluloses are amorphous, branched polymers, in contrast to cellulose which is a linear polymer. Lignin is a complex aromatic polymer and comprises about 20% to 40% of wood where it occurs as an amorphous polymer.

In general, kraft processing involves chemically digesting cellulosic feedstock (e.g., wood chips) at elevated temperature and pressure in white liquor, which is an aqueous solution of cooking chemicals (e.g., sodium sulfide and sodium hydroxide). The cooking chemicals swell the wood and dissolve lignin that binds together cellulose fibers within the feedstock. When this chemical digestion is complete, the pulp is transferred to an atmospheric tank known as a "blow tank." The contents of the blow tank are then sent to pulp washers, where the spent cooking chemicals are separated from the pulp. The pulp then proceeds through various stages of washing and bleaching, after which it is pressed and dried into a finished product.

The kraft process is designed to recover the cooking chemicals and heat from kraft process steps. For example, spent cooking chemicals and pulp wash water can be combined to form a weak black liquor that is concentrated in a multiple-effect evaporator system to about 55% solids. The black liquor can then be further concentrated to 65% solids in a direct-contact evaporator by bringing the liquor into contact with flue gases from a recovery furnace or in an indirect-contact concentrator. The strong black liquor can then be fired in a recovery furnace. Combustion of organics dissolved in the black liquor can provide heat for generating process steam and for converting sodium sulfate to sodium sulfide. Inorganic chemicals present in the black liquor may collect as a molten smelt at the bottom of the furnace. The smelt can be dissolved in water to form green liquor, which can then be transferred to a causticizing tank where quicklime (calcium oxide) can be added to convert the solution back to white liquor for return to the digester system. A lime mud precipitate from the causticizing tank can be calcined in a lime kiln to regenerate quicklime.

FIG. 1 is a flow chart illustrating a method 100 for making pulp in accordance with an embodiment of the present disclosure. In the illustrated embodiment, the method 100 is based on a kraft process. In other embodiments, counterparts of the method 100 can be based on other suitable processes (like sulfite). With reference to FIG. 1, the method 100 can include a pulping process block 102 and a post-pulping process block 104. Within the pulping process block 102, the method 100 can include loading chips (process block 106) and pre-steaming the chips (process block 108). Steam at atmospheric pressure can be used to preheat the chips and drive off air to enhance liquor penetration. After pre-steaming, the method 100 can include adding chemicals (e.g., NaOH, Na$_2$S, and/or other suitable chemicals) to the chips (process block 110). For example, the chemicals can be added as a cooking liquor. The wood chips and cooking liquor can then be fed into a digester. Within the digester, the cooking liquor can be allowed to impregnate the wood chips (process block 112). Good penetration of the cooking liquor can promote uniform cooking of the wood chips.

After impregnation, the method 100 can include cooking the wood chips and cooking liquor in co-current (process block 114) and counter-current (process block 116) liquid contact. In either operation, the cooking liquor and chips can be brought to temperature. Next, wash liquor can be introduced into the bottom of the digester such that it flows counter-currently to the cooked pulp (process block 118). Cooking can end when the pulp encounters the cooler wash liquor. After digester washing, the digester contents can be blown (process block 120). Digester blowing can involve releasing wood and liquor at atmospheric pressure. The release can occur with a sufficient amount of force to cause fiber separation. If desired, the blow tank can be equipped with heat recovery equipment to reduce operating expenses. Finally, the pulp can be sent from the blow tank to an external pulp washer for separation of black liquor from the pulp (process block 122).

Following the pulping process block 102, the pulp can be bleached and cellulose fibers within the pulp can be crosslinked. In a standard kraft process, bleaching occurs without crosslinking. Bleaching typically does not cause a substantial reduction of the hemicellulose content of a pulp. Instead, bleaching involves removal of lignin with an attendant decrease in pulp fiber length and viscosity. During bleaching, pulp can be treated with various chemicals at different stages in a bleach plant. The stages can be carried out in vessels or towers of conventional design. Bleaching typically occurs as a sequence of operations, such as one or more bleaching stages with different bleaching agents (e.g. oxygen, chlorine dioxide, etc.), extraction stages, other treatment stages, and so forth. The bleaching sequence may be identified in terms of the order of the operations performed in the sequence. For example, one example of a bleaching sequence is O-D-E-D. Such a bleaching sequence can include an oxygen bleaching stage (an "O stage"), followed by a first chlorine dioxide bleaching stage (a "D stage"), followed by an extraction stage (an "E stage," or "EOP stage" in which bleaching chemicals such as peroxide ("P") and/or oxygen ("0") are mixed with caustic for removing lignin), and a second D stage. Several additional examples of bleaching processes are described in U.S. Pat. Nos. 6,331,354, and 6,605,350, which are incorporated herein by reference in their entireties.

The post-pulping process block 104 can include first bleaching the pulp with oxygen (process block 124). Bleaching pulp with oxygen tends to be less specific for the removal of lignin than bleaching pulp with chlorine dioxide. The oxygen bleaching can take place in an oxygen reactor under pressure. Suitable oxygen reactors and associated oxygen bleaching processes are described in U.S. Pat. Nos. 4,295,925, 4,295,926, 4,298,426, and 4,295,927, which are incorporated herein by reference in their entireties. The amount of oxygen added to the pulp can be within a range from 50 to 80 pounds per ton of pulp. The temperature during the oxygen bleaching can be within a range from 100° C. to 140° C.

After oxygen bleaching the pulp, the method 100 can include crosslinking cellulose fibers within the pulp (process block 126). In at least some cases, this includes adding a crosslinker and caustic to the pulp and allowing a crosslinking reaction to occur before further processing the pulp.

As discussed further herein, crosslinking while the consistency of the pulp is relatively high can be useful to increase the ability of the pulp to produce high-grade cellulose derivatives. In that regard, the consistency of the pulp during all or a portion (e.g., at least 50% by time) of the crosslinking can be at least 30% (e.g., within a range from 30% to 50%) or at least 35% (e.g., within a range from 35% to 50%). In an embodiment, the pulps are mixed in a batch or a continuous mixer. In an embodiment, pulps are mixed in a refiner, an extruder, or other high-consistency mixer. In an embodiment, pulps are mixed with high-consistency mixers, such as, an Andritz™ mixer or a Loedige™ mixer, as described further herein with respect to, for example, EXAMPLE 1. In an embodiment, pulps are mixed in a system including counter-rotating plates into which, for example, pulp and crosslinker are added. In an embodiment, the pulps are mixed in a system including one or more rotating plough-like instruments such as in a ploughshare mixer.

In an embodiment, stable flow pumps, such as gear pumps, or pumps that do not have a pulse or with minimal pulse are used to meter crosslinking reactants, such as a crosslinker, alkaline hydroxide, catalyst, and the like, into a reactor prior to crosslinking. In this way, a uniform distribution of crosslinking reactants is provided in the reactor for crosslinking. Such even distribution of crosslinking reactants typically provides consistently and evenly crosslinked pulps, which are in turn suitable for making crosslinked ethers of even viscosity.

Such high-consistency mixers and mixing provide intimate mixing and contact between pulp and crosslinkers resulting in fewer undesired side reactions between, for example, crosslinker and water (and thus more desired reactions between crosslinker and cellulose) and using less reactor space for a given number of useful crosslinking reactions. In this regard, the methods of the present disclosure are suitable to use less crosslinker than methods that crosslink pulps at lower consistency. Conversely, methods that crosslink at lower consistency have a higher water content, thus lowering crosslinker concentration in water and generating fewer interactions between crosslinkers and cellulose. Accordingly, for a given degree of crosslinking more crosslinker is required and more reactions between water and crosslinker occur. Additionally, the methods of the present disclosure provide crosslinked pulps in less reactor space and requiring less capital than methods that crosslink pulps at lower consistency due to the higher degree of intimate mixing achieved between, inter alia, fibers and crosslinker. Such advantageous characteristics of the methods of the present disclosure result in crosslinked pulps suitable for producing high-viscosity crosslinked ether products at lower cost and with less capital than other lower-consistency methods.

Furthermore, due to the relatively high consistency and/or other factors, crosslinking can increase alkaline resistance (as measured, for example, by crosslinked pulp R18 value) of the pulp. In an embodiment, the crosslinked wood pulps made by methods according the present disclosure have an R18 value greater than 89%. In an embodiment, the crosslinked wood pulps made by methods according the present disclosure have an R18 value greater than 93%, as discussed further herein with respect to EXAMPLE 1. In an embodiment, the crosslinked wood pulps according the present disclosure have an R18 value in a range of greater than 92% to 100%. In an embodiment, the crosslinked wood pulps according the present disclosure have an R18 value in a range of 93% to 95%. In contrast, crosslinking processes having crosslinking consistencies of less than 30% typically provide wood pulp R18 values less than 92%. As discussed further herein, such crosslinking processes may produce crosslinked pulps having WRV less than 1.0 g/g. In certain embodiments, such pulps have pulp R18 values greater than 89% and WRV less than 1.0 g/g.

Additionally, in an embodiment, during crosslinking the pulps in the crosslinking stage have an alkaline ion concentration that is highly consistent due to the high degree of pulp consistency. As discussed further herein, in an embodiment crosslinking bleached pulp includes providing an alkaline hydroxide to the bleached pulp. Because of the intimate mixing during crosslinking between the cellulose fibers and alkaline hydroxide solution, including for example sodium hydroxide, the pulp in the crosslinking stage has a low sodium ion concentration coefficient of variability (COV). In an embodiment, the pulps described herein have a sodium ion concentration COV during crosslinking of less than 10, such as less than 5, as discussed further herein with respect to EXAMPLE 12.

The crosslinker used in the methods of the present disclosure can be selected to form relatively strong crosslink bonds (e.g., ether crosslinks instead of ester or ionic crosslinks). Relatively strong crosslinks can be preferable to weaker crosslinks, for example, so that the crosslinks will be less likely to be disrupted by functionalizing reactions (e.g., etherification) used to form cellulose derivatives. The crosslinker can be added at a weight ratio relative to the pulp of greater than or equal to 2:100, greater than or equal to 3:100, greater than or equal to 5:100, or greater than or equal to another suitable lower threshold. The upper threshold can be a maximum amount of crosslinker that can be used without causing resultant CMC from the pulp to become insoluble in water. In at least some cases, a catalyst (e.g., NaOH, zinc tetrafluoroborate, $Zn(BF_4)_2$) is present during crosslinking. In addition or alternatively, a surfactant can be present during crosslinking, such as to promote crosslinker dispersion and penetration. A surfactant can be especially useful in conjunction with a hydrophobic crosslinker.

Suitable crosslinkers include ethers, such as glycidyl ethers having two or more glycidyl groups. For example, the crosslinker can include a first glycidyl group, a second glycidyl group, and either three or four linear chain carbon atoms between the first and second glycidyl groups. In an embodiment, the crosslinker includes three or more glycidyl groups. In addition or alternatively, the crosslinker can have weight average molecular weight less than or equal to 500 (e.g., within a range from 174 to 500). Furthermore, when the crosslinker is an epoxide, the crosslinker can have a weight per epoxide less than or equal to 175 (e.g., within a range from 140 to 175). The crosslinker can have a viscosity of less than or equal to 500 centipoise (cP) at 25° C. In at least some embodiments, the crosslinker is at least partially insoluble in water. This property can be useful, for example, to increase contact between the crosslinker and cellulose fibers during the crosslinking reaction. Specific examples of suitable crosslinkers include trimethylolethane triglycidyl ether, 1,4-butanediol diglycidyl ether, glycerol diglycidyl ether, neopentyl glycol diglycidyl ether, glycerol polyglycidyl ether, glycerol triglycidyl ether, ethyleneglycol diglycidyl ether, and trimethylol propane triglycidyl ether, among others or their mixture.

Conventional, non-crosslinked kraft pulps tend to have lower reactivity than other chemical pulps, such as sulfite pulps (i.e., pulps made by extracting lignin from wood primarily using salts of sulfurous acid). In at least some embodiments of the present disclosure, however, crosslinked kraft pulp has relatively high reactivity. Solely by way of theory and without wishing to be limited to such theory, this may be due to the presence of crosslinks that add extra space uniformly between cellulose chains. Longer chain crosslinkers (e.g., polyglycidyl ether) may produce crosslinked pulp with higher reactivity than shorter chain crosslinkers (e.g., 1,3-dichloro-2-hydroxypropanol (DCP)) under similar crosslinking conditions. Pulps crosslinked with longer chain crosslinkers may have crystallinity indexes lower than those of starting pulps and much lower than those of dissolving grade sulfite wood pulp and cotton linters pulp (CLP). Crosslinking kraft pulp instead of sulfite pulp for high viscosity ether applications can be advantageous in at least some cases because kraft is the dominant pulping process, has higher yield (due at least in part to higher hemicellulose content), lower cost, and is more environmentally friendly than sulfite pulping processes.

In certain embodiments, crosslinking the bleached pulp comprises sequentially dosing the bleached pulp with crosslinking reactants, including mixtures including two or more crosslinking reactants. In this regard and as discussed further herein with respect to Sample 5A, in an embodiment, crosslinking the bleached pulp includes sequentially contacting the bleached pulp with an alkaline hydroxide solution, a first portion of water, an crosslinker solution, emulsion, or suspension, and a second portion of water. In certain embodiments, crosslinking the bleached pulp comprises providing a solution including the alkaline hydroxide and the crosslinker to the bleached pulp a plurality of times. In that regard, in an embodiment, crosslinking the bleached pulp includes contacting the bleached pulp with a first portion alkaline hydroxide and a first portion of crosslinker and subsequently contacting the bleached pulp with a second portion of alkaline hydroxide and a second portion of crosslinker after allowing the bleached pulp to react with the first portion of alkaline hydroxide and first portion of crosslinker. In another embodiment, crosslinking the bleached pulp includes contacting the bleached pulp with a mixture including the crosslinker and the alkaline hydroxide a number of different times. Multiple dosing of alkaline hydroxide and crosslinker can have higher chemical utilization and/or lower reaction costs. Further, such sequential dosing including providing the alkaline hydroxide and the crosslinker to the bleached pulp a plurality of times allows for mixers with dosing control.

During crosslinking, the pulp can have a temperature within a range from 30° C. to 90° C. Furthermore, the pulp can have a pH within a range from 9 to 14.

Figure 2:
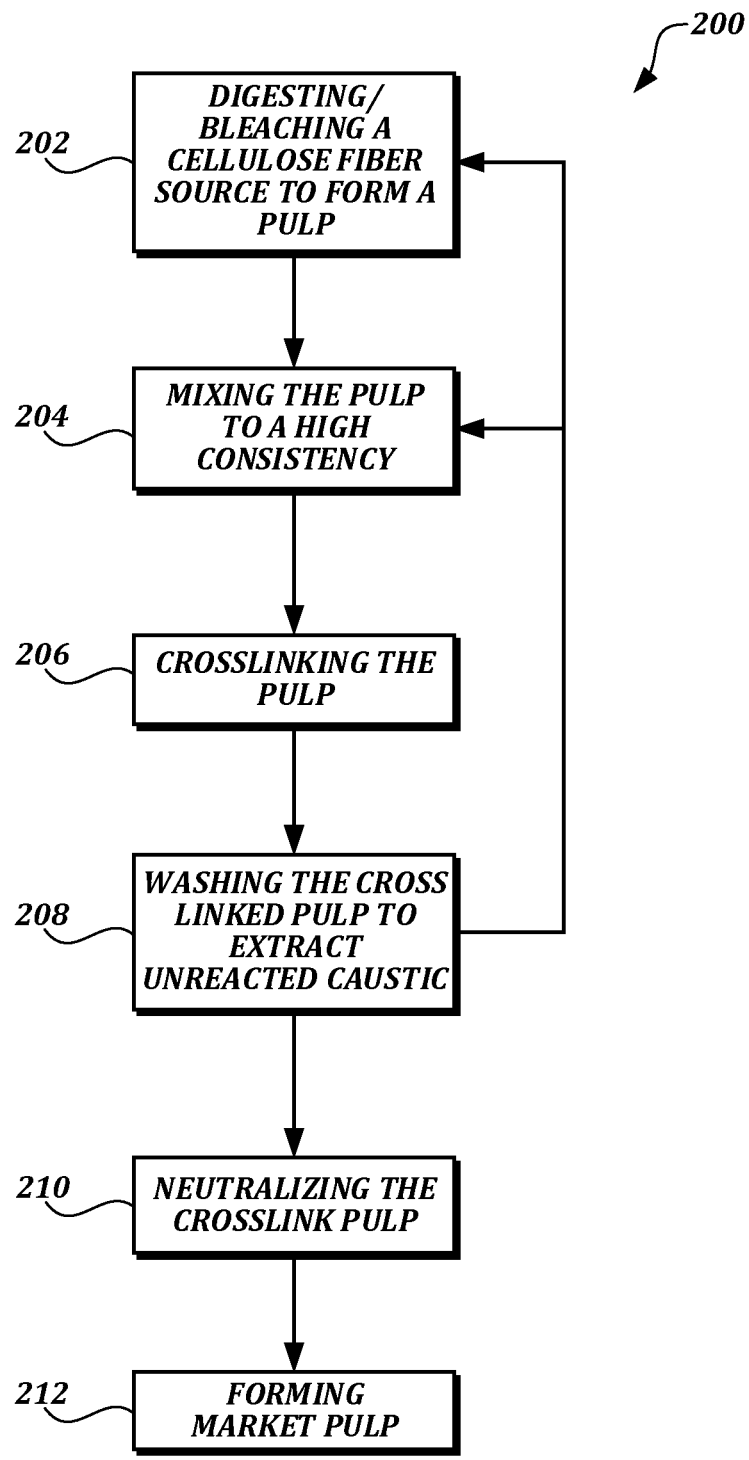
FIG. 2 is a schematic illustration of another method for making a pulp in accordance with an embodiment of the disclosure.

In an embodiment the methods of the present disclosure include extracting the alkaline hydroxide from the crosslinked pulp after crosslinking cellulose fibers, as discussed further herein with respect to EXAMPLES 2 and 3. Referring now to FIG. 2, a method 200 of the present disclosure including extraction and reuse of caustic is discussed. In certain embodiments, method 100 and/or other methods of the present disclosure include one or more aspects of method 200. In an embodiment, method 200 begins with process block 202 including digesting and bleaching a cellulose fiber source to provide a pulp. In an embodiment, digestion and bleaching is performed as discussed further herein with respect to FIG. 1. Process block 202 may be followed by process block 204 including mixing the bleached pulp, such as to a consistency of greater than 30%. Process block 204 may be followed by process block 206 including crosslinking the bleached, high-consistency pulp with an alkaline hydroxide and a crosslinker. As discussed further herein, such high-consistency crosslinking reactions provide numerous advantages over lower-consistency crosslinking reactions, including but not limited to higher R18 values, lower crosslinking reagent requirements, and more consistent pulps as measured by, for example, CMC viscosity COV, alkaline ion COV, among others.

In an embodiment, process block 206 is followed by process block 208, which can include washing the crosslinked pulp and recovering a portion of the alkaline hydroxide used to crosslink the bleach, high-consistency pulp. As shown, the recovered alkaline hydroxide can be reused in either or both digestion and bleaching process block 202 and mixture process block 204. Such recovery and reuse of caustic can provide economic efficiencies through reuse of reactants and removal of undesired organic components in the mixture. Process block 208 may be followed by process block 210 including neutralizing the crosslinked, washed pulp, such as through application of an acidic solution to the crosslinked, washed pulp. As discussed herein with respect to EXAMPLES 2 and 3, washing and neutralizing the crosslinked pulp can reduce levels of pulp components, such as extracted organic content, metal ion content, ash content, and silica content. In an embodiment, process block 210 is followed by process block 212, which may include forming market pulp as discussed further herein with respect to process block 134 of FIG. 1.

Crosslinking pulp in accordance with embodiments of the present disclosure can be used in combination with other techniques for increasing the ability of pulp to produce high-grade cellulose derivatives. For example, referring again to FIG. 1, the cooking described above in the pulping process block 102 can be relatively mild. With relatively mild cooking, less lignin may be removed from the pulp than would otherwise be the case. After mild cooking, the pulp may have a kappa number from 25-35 indicating the presence of significant residual lignin and high pulp viscosity. As another example, the bleaching and extraction described below in the post-pulping process block 104 can be relatively mild. Unlike modifying the kraft process by adding strong caustic extraction and prehydrolysis, the aforementioned modifications to the kraft process can incrementally improve the ability of kraft pulp to produce high-grade cellulose derivatives without unduly compromising yield and/or reactivity.

After crosslinking cellulose fibers within the pulp, the method 100 can include bleaching the pulp with chlorine dioxide a first time (process block 128). Chlorine dioxide bleaching tends to be more selective than oxygen bleaching for removing lignin. The amount of chlorine dioxide added to the pulp can be within a range from 20 to 30 pounds per ton of pulp. The temperature during the first chlorine dioxide bleaching can be within a range from 50° C. to 85° C. After chlorine dioxide bleaching the pulp the first time, the method 100 can include extraction (process block 130), to remove lignin from the pulp. The extraction can include adding hydrogen peroxide or a suitable caustic to the pulp. The amount of hydrogen peroxide added to the pulp can be within a range from 20 to 100 pounds per ton of pulp. The temperature during extraction can be within a range from 75° C. to 95° C. In contrast to strong caustic extraction for removing hemicellulose, extraction for removing lignin can be relatively mild. For example, the extraction can be one that does not change the crystal structure of the cellulose fibers.

After extraction, the method 100 can include bleaching the pulp with chlorine dioxide a second time (process block 132). The amount of chlorine dioxide added to the pulp can be within a range from 10 to 30 pounds per ton of pulp. The temperature during the second chlorine dioxide bleaching can be within a range from 60° C. to 90° C. The method 100 can further include additional operations other than the operations specifically identified in FIG. 1. For example, after any of the operations in the post-pulping process block 104, the method 100 can include washing the pulp. This can be useful, for example, to remove carryover and to increase pulp consistency. A washing operation can be used to increase the pulp consistency after oxygen bleaching the pulp and before crosslinking the pulp.

Although crosslinking in the illustrated embodiment occurs after oxygen bleaching and before the chlorine dioxide bleaching, in other embodiments crosslinking can occur at another point in a counterpart of the post-pulping process 104 as described below. The bleaching and extraction operations can also be rearranged or removed in other embodiments. If "X" is defined as a crosslinking operation, post-pulping methods in accordance with several embodiments of the present technology can be characterized as: O-X-D-E-D (FIG. 1), O-D-X-E-D, O-D-E-X, O-D-E-X-D, O-D-E-D-X, D-X-E-D-E-D, D-E-X-D-E-D, D-E-D-X-E-D, D-E-D-E-X-D, D-E-D-E-D-X, D-X-E-E-D, D-E-X-E-D, D-E-E-X-D, or D-E-E-D-X, among numerous other suitable permutations. Furthermore, the crosslinking can occur during oxygen bleaching, chlorine dioxide bleaching, and/or extraction. Thus, post-pulping methods in accordance with several more embodiments of the present technology can be characterized as: O/X-D-E-D, O-D/X-E-D, O-D-E/X-D, O-D-E/X, O-D-E-D/X, D/X-E-D-E-D, D-E/X-D-E-D, D-E-D/X-E-D, D-E-D-E/X-D, D-E-D-E-D/X, D/X-E-E-D, D-E/X-E-D, D-E-E/X-D, D-E-E-D/X, among numerous other suitable permutations.

After the bleaching process block 104, the method 100 can include processing the pulp for use, sale, and/or transport (process block 134). For example, the pulp can be dried (e.g., flash dried), pressed, containerized, and/or otherwise processed to put the pulp into a suitable form (e.g., sheet, bale, roll, etc.) for use, sale, and/or transport. The pulp can have a basis weight from 500 g/m$^2$ to 1200 g/m$^2$ and/or a density of 0.2 g/cm$^3$ to 0.9 g/cm$^3$. In some embodiments, the pulp of the method 100 is combined with another pulp before being dried. Pulps in accordance with at least some embodiments of the present disclosure are well suited for use as pulp extenders that reduce the amount of expensive dissolving-grade pulp needed for producing a given cellulose derivative product without compromising the viscosity or other desirable properties of the product. For example, the pulp of the method 100 can be blended with another pulp (e.g., a dissolving-grade pulp having a cellulose content greater than 90 wt. % by oven dried (OD) weight) such that the pulp of the method 100 makes up at least 20 wt. % (e.g., at least 30 wt %) by cellulose oven-dried weight of a resulting blended pulp. In other embodiments, the pulp of the method 100 can be used without being blended with another pulp.

In an embodiment, the dried pulp is further processed or formed into a form suitable for shipping, sale, and the like selected from a roll, a bale, and fluff.

Dry and Semi-Dry Pulp Crosslinking

In certain embodiments, the methods of the present disclosure include contacting wood fibers with a crosslinker and an alkaline hydroxide, wherein the wood fibers have a water content in a range of about 0 wt. % to about 50 wt. %. In an embodiment, a water content of the wood fibers is in a range of about 0 wt. % to about 10%. In this instance, about 0 wt. % refers a water content between 0 wt. % and 1 wt. %, as limited by detection limits known in the art. Without wishing to be bound by theory, it is believed that by contacting such dry or semi-dry wood fibers with cross linker and alkaline hydroxide intimate mixing of the crosslinker and the wood fibers is achieved without actively mixing the pulp, such as by mixing an aqueous suspension or solution in a reaction vessel. Additionally, without wishing to be bound by theory it is believed that voids within the dry and semi-dry wood fibers are filled with alkaline hydroxide and crosslinker solutions. This is contrast to other methods in which wood fibers are dispersed in relatively dilute solutions of alkaline hydroxide and crosslinker.

Figure 3:
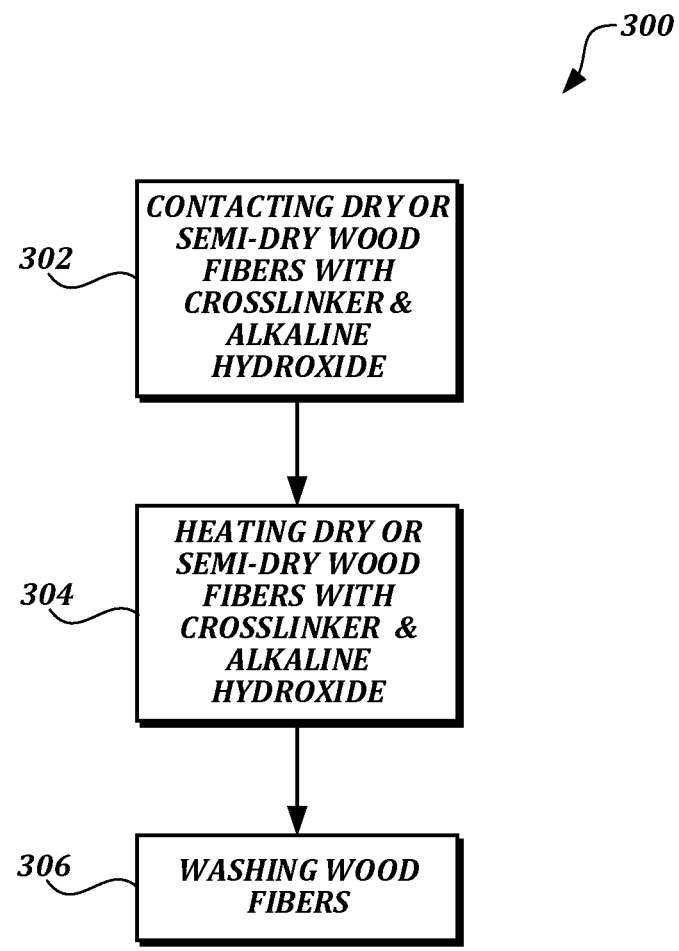
FIG. 3 is a schematic illustration of yet another method for making a pulp in accordance with an embodiment of the disclosure.

FIG. 3 schematically illustrates a method 300 in accordance with an embodiment of the disclosure including contacting a dry or semi-dry wood fiber with an alkaline hydroxide and a crosslinker. Method 300 may begin with process block 302 including contacting a dry or semi-dry wood fiber with an alkaline hydroxide and a crosslinker. In an embodiment, the dry or semi-dry wood fibers are in the form of a pulp sheet having a water content in a range of about 0 wt. % to about 50 wt. %. The crosslinker may be any crosslinker discussed herein, such as glycidyl ethers. In an embodiment, the dry or semi-dry wood fibers are saturated with alkaline hydroxide and crosslinker solutions. In an embodiment, the wood fibers are contacted with alkaline hydroxide in a range of about 1 wt. % to about 5 wt. %. In an embodiment, the wood fibers are contacted with alkaline hydroxide in a range of about 1 wt. % to about 10 wt. %.

In an embodiment, process block 302 is followed by process block 304 including heating the wood fibers, the crosslinker, and the alkaline hydroxide at a temperature and for a time sufficient to provide crosslinked wood fibers having a number of crosslinks. In an embodiment, heating the wood fibers, the crosslinker, and the alkaline hydroxide includes heating the wood fibers, the crosslinker, and the alkaline hydroxide at a temperature in a range of about 100° C. to about 140° C. In an embodiment, heating the wood fibers, the crosslinker, and the alkaline hydroxide includes heating the wood fibers, the crosslinker, and the alkaline hydroxide at a temperature of about 120° C. In an embodiment, the wood fibers, crosslinker, and alkaline hydroxide are heated for time in a range of about 5 minutes to about 20 minutes without evaporating all water absorbed by the wood fibers.

Process block 304 may be followed by process block 306 including washing the crosslinked wood fibers to remove unreacted crosslinker and alkaline hydroxide. In an embodiment, washing further includes neutralizing a pH of the crosslinked wood fibers, such as with an acidic solution.

As discussed further herein with respect to EXAMPLE 5, CMC made from pulps made from a method including contacting dry or semi-dry wood fibers with a crosslinker and an alkaline hydroxide, such as method 300, can have viscosities greater than 80 cP, such as greater than 100 cP, greater than 110 cP, greater than 120 cP, etc. In an embodiment, CMC made from pulps made according to such methods have viscosities in a range of about 80 cP to about 140 cP. Further, in an embodiment, crosslinked pulps made from a method including contacting dry or semi-dry wood fibers with a crosslinker and an alkaline hydroxide, such as method 300, have an R18 value of greater than 92%. In an embodiment, such pulps have an R18 value in a range of 93% to 100%. Accordingly, methods including contacting dry or semi-dry wood fibers with a crosslinker and an alkaline hydroxide, such as method 300, are suitable to provide crosslinked pulps for making high-viscosity crosslinked cellulose ether products.

Pulp Processing with Caustic Extraction and Pulp Washing

Figure 4:
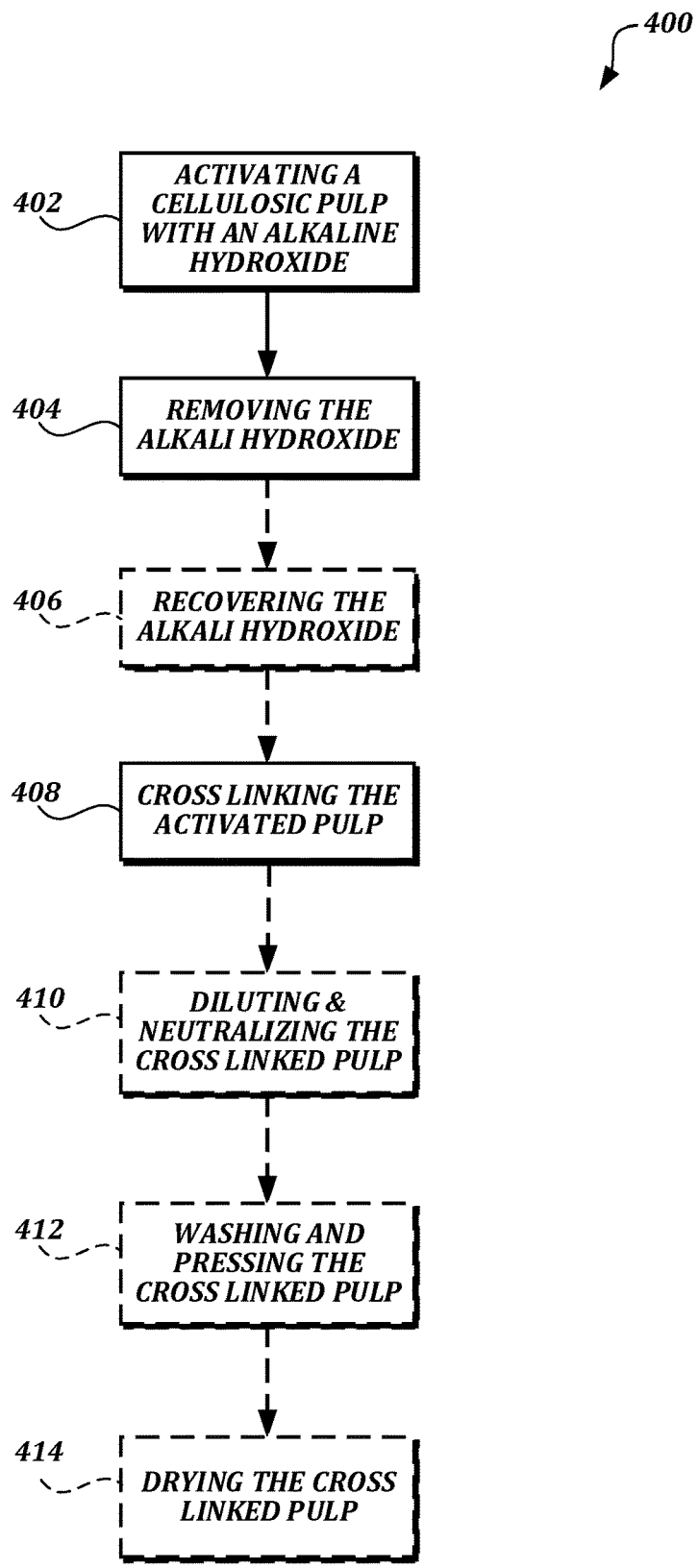
FIG. 4 is a schematic illustration of another method for making a pulp in accordance with an embodiment of the disclosure.

In an embodiment, the methods of the present disclosure include activating a cellulosic pulp with an alkali hydroxide to provide an activated pulp; removing the alkaline hydroxide from the activated pulp; and crosslinking the activated pulp with a crosslinker to provide a crosslinked pulp. In that regard, attention is directed to FIG. 4 in which a method 400 in accordance with an embodiment of the disclosure is schematically illustrated.

Method 400 may begin with process block 402 including activating a cellulosic pulp with an alkali hydroxide to provide an activated pulp. In an embodiment, the cellulosic pulp is a CLP. In an embodiment, the cellulosic pulp is a kraft pulp. In an embodiment, activating the cellulosic pulp includes activating the pulp at a consistency of greater than 4%, such as greater than 16%.

Process block 402 may be followed by process block 404 including removing the alkaline hydroxide from the activated pulp, such as by filtration. In an embodiment, process block 404 is followed by process block 406 in which the removed alkaline hydroxide is recovered and reused for subsequent pulp reactions, as discussed further herein.

Process blocks 402, 404, or 406 may be followed by process block 408 including crosslinking the activated pulp with a crosslinker. In an embodiment, crosslinking the activated pulp with a crosslinker includes crosslinking the activated pulp at a consistency of greater than 20%, such as greater than 30%. As shown further herein with respect to EXAMPLES 2 and 3, by crosslinking at a higher consistency, such as greater than 20%, and by removing the alkaline hydroxide, viscosities of CMCs made from such extracted and higher-consistency pulps are likewise higher. See, for example, the consistencies of resultant CMC viscosities of Sample 3B vs. Sample 3A and Sample 4B vs. Sample 4A in TABLE 2.

In an embodiment, crosslinking the activated pulp with a crosslinker includes crosslinking at a temperature in a range of 30° C. to 95° C. In an embodiment, crosslinking the activated pulp with a crosslinker includes crosslinking at a temperature in a range of 70° C. to 95° C. As shown further herein with respect to EXAMPLES 2 and 3, crosslinking the pulp at an elevated temperature, such as in a range of 70° C. to 95° C., provides pulps useful in preparing CMC having high viscosities. See for example, the viscosities of CMC made from Sample 4C and Sample 3C. In an embodiment, viscosities of resultant CMCs are in a range of about 100 cP to about 400 cP.

In an embodiment, process block 408 is followed by process block 410 including drying the crosslinked pulp. Process blocks 408 and 410 can be followed by process block 412 including washing and pressing the crosslinked pulp to provide a pressed pulp. Such washing and pressing can be achieved by methods discussed further herein with respect to, for example, method 100 and FIG. 1. Process blocks 408, 410, and 412 and can be followed by process block 414 including diluting and neutralizing the pressed pulp. As discussed further herein with respect to EXAMPLE 6, such washing and neutralizing is suitable, for example, to reduce levels of organic extractives, metals, ash, and silica in pulps.

Pulps

In another aspect, the present disclosure provides pulps, including crosslinked cellulose fibers. In an embodiment, the pulps are pulps made according to the methods described herein.

Pulp R18 Values

In an embodiment, the pulps of the present disclosure have an R18 value that is greater than 89%. In an embodiment, the pulps of the present disclosure have an R18 value that is greater than 92%. As discussed further herein with respect to the methods of the present disclosure, crosslinking pulps at high consistencies, such as greater than 20%, 30%, or higher, generally provides crosslinked pulps having relatively high alkaline resistance, as measured by pulp R18 values. Conversely, crosslinking at consistencies lower than, for example, 30% provides pulps with R18 values lower than, for example, 93%. As shown in, for example, EXAMPLES 1-3, such high-consistency crosslinking provides pulps having pulp R18 values in a range of about 92% to about 100%.

In an embodiment, the pulps have a pulp R18 value in a range of about 92% to about 100%. In this instance, a pulp R18 value of about 100% refers to a pulp R18 value between 99% and 100% as limited by known detection methods, such as by TAPPI T 235 cm-00. In an embodiment, the pulps of the present disclosure have a pulp R18 value in a range of about 93% to about 97%. In an embodiment, the pulps of the present disclosure have a pulp R18 value in a range of about 93% to about 96%. In an embodiment, the pulps of the present disclosure have a pulp R18 value in a range of about 93% to about 95%.

Resultant CMC Viscosity

In an embodiment, the pulps of the present disclosure have a resultant CMC viscosity of greater than 56 cP. In an embodiment, the pulps of the present disclosure have a resultant CMC viscosity of greater than 90 cP. In an embodiment, the pulps of the present disclosure have a resultant CMC viscosity in a range of about 100 cP to about 400 cP.

In certain embodiments, the pulps of the present disclosure have high degrees of crosslinking in certain instances due to high-consistency crosslinking reactions. Additionally, as above, the resultant CMC viscosity for these pulps may be very high. Solely by way of theory, and without wishing to be bound to such theory, the molecular structure of the cellulose may change from linear to highly branched at high degrees of crosslinking, such as those achieved by embodiments of the methods of the present disclosure. Cellulose having a highly branched structure is capable of forming high-grade ether, such as a high-grade CMC.

As discussed further herein with respect to EXAMPLES 1 and 2 and TABLES 1 and 2, pulps crosslinked at high consistencies in accordance with embodiments of the disclosure have such high resultant CMC viscosities. In this regard, in an embodiment, the pulps of the present disclosure have a resultant CMC in a range of 90 cP to 130 cP shown in TABLE 1. In an embodiment, the pulps of the present disclosure have a resultant CMC in range of about 100 cP to about 400 cP, as shown in TABLE 2.

Further, the resultant CMC viscosities of pulps of the present disclosure are in contrast to those of, for example, conventional CLP. As described in EXAMPLE 6 and shown in TABLE 3, the resultant CMC viscosity of pulps in accordance with embodiments of the disclosure and produced by methods of the present disclosure have higher resultant CMC viscosities than those of CLIP. As discussed further herein, CLPs are frequently more expensive than kraft pulps, such as those described in EXAMPLE 6, at least in part because they are useful in producing high-grade, high-viscosity ethers. However, as shown herein, in certain instances the pulps of the present disclosure, such as those made by a modified kraft process, are suitable to make CMCs of higher viscosity than the more expensive CLPs.

As used herein, a "resultant CMC viscosity" refers to the viscosity of a 0.5 wt. % aqueous solution of resultant CMC according to the Resultant CMC Testing Method described herein.

Resultant CMC Viscosity Coefficient of Variability

In an embodiment, the pulps of the present disclosure have a resultant CMC viscosity coefficient of variability (COV) of less than 37%. As discussed further herein with respect to EXAMPLE 9 and TABLES 6A-6C, CMC made from the pulps of the present disclosure have a viscosity COV of less than 37%, such as 20% or less, 15% or less, etc. Without wishing to be bound by theory, it is believed that by crosslinking pulps at high consistency that crosslinked pulps are relatively evenly crosslinked and, accordingly, CMCs made therefrom have viscosities with low viscosity COVs.

In that regard, in an embodiment, the pulps of the present disclosure have resultant CMC viscosities COV in a range of about 5% to less than 38%. In an embodiment, the pulps of the present disclosure have resultant CMC viscosities COV in a range of about 37% to about 20%. As discussed further herein with respect to TABLE 6B, CMCs made from pulps crosslinked with a ploughshares mixer, such as a Loedige™ mixer, have viscosities with COVs in a range from about 37% to about 20%. In an embodiment, the pulps of the present disclosure have resultant CMC viscosities COV in a range of about 5% to about 15%. In an embodiment, the pulps of the present disclosure have resultant CMC viscosities COV in a range of about 10% to about 12%. As discussed further herein with respect to TABLE 6C, CMCs made from pulps crosslinked in a reactor including counter rotating plates, such as an Andritz™ mixer, have viscosities with COVs ranging from about 5% to about 15%.

In an embodiment, the pulps of the present disclosure having a resultant CMC viscosity COV less than 37% further have a pulp R18 value greater than 92%. As is discussed further herein with respect to EXAMPLE 9 and TABLES 6B, 6C, and 1, such pulps have relatively high alkaline resistance, in addition to low resultant CMC viscosity COV.

Alkaline Ion Concentration COV

In certain embodiments, the pulps of the present disclosure have relatively low alkaline ion concentration COV. As is discussed further herein, the methods of the present disclosure crosslink pulps at high consistencies. Without wishing to be bound by theory, it is believed that such high degrees of consistency provide highly uniform crosslinking reaction environments. In this regard, crosslinking environments and resultant crosslinked pulps have certain crosslinking reagents, such as alkaline ions, evenly distributed within the pulp, such as when a pulp has been crosslinked but not washed or neutralized. In an embodiment, the pulps described herein have a sodium ion concentration COV during crosslinking of less than 10, such as less than 5, as discussed further herein with respect to EXAMPLE 12.

Resultant CMC Polydispersity Index

In certain embodiments, the pulps of the present disclosure have a resultant CMC polydispersity index (PDI) of greater than or equal to about 3. In an embodiment, the pulps of the present disclosure have resultant CMC PDIs greater than about 4.5. In an embodiment, the pulps of the present disclosure have resultant CMC PDIs in a range of 4.5 to about 7. In an embodiment, the pulps of the present disclosure have resultant CMC PDIs in a range of about 5.0 to about 6.5. As shown in TABLE 1, such relatively high PDIs are in contrast to those of CMCs prepared from conventionally available pulps, such as cotton liners pulps, dissolving wood pulp (DWP) sulfite pulps, and conventionally crosslinked kraft pulps, which are typically 2 or less. As used herein, resultant CMC PDI is ratio of CMC weight average molecular weight to CMC number average molecular weight.

Without being bound by theory, it is believed that relatively high PDI of the ethers of the present disclosure are due, at least in part, addition of higher-$M_w$ molecules to smaller molecules due to crosslinking, and not, for example, due to cellulose degradation. Compared with control pulp PDI (see TABLE 1 and TABLE 2), molecules in the crosslinked pulp of the present disclosure had increased molecular length. During crosslinking longer rather than shorter molecules are generated. In this regard and others a high PDI is advantageous. For example, a higher $M_w$ in resultant ether renders the final product stronger and more elastic even at lower concentration. Further, such higher-weight-average-$M_w$ resultant ethers have greater shear thinning at a higher shear rate than ethers with a lower PDI.

Water Retention Values

In certain embodiments, the pulps of the present disclosure have water retention values (WRV) in a range from about 0.8 g/g to about 1.0 g/g. In certain embodiments, the pulps of the present disclosure have WRV in a range of about 0.8 g/g to less than 1.0 g/g. In an embodiment, the pulps of the present disclosure have WRV in a range of about 0.8 g/g to less than 1.0 gig and a pulp R18 value in a range of 89% to 94%. In an embodiment, the pulps of the present disclosure have WRV in a range of about 0.8 g/g to less than 1.0 g/g and a pulp R18 value in a range of 92% to 94%. In an embodiment, the pulp is a kraft pulp having WRV in a range of about 0.8 g/g to less than 1.0 g/g and a pulp R18 value in a range of 92% to 94%. As described in EXAMPLE 10 and TABLE 7, pulps in accordance with embodiments of the present disclosure and prepared as in EXAMPLE 1 have WRV in a range of about 0.8 g/g to less than 1.0 g/g. Further, such pulps have pulp R18 values of 92% to 94%. As discussed further herein with respect to EXAMPLE 1, such pulps were kraft pulps prepared with crosslinking consistencies of greater than 30%. Such pulps are in contrast to pulps crosslinked at consistencies of less than 30%, which typically have R18 values of less than 92% and WRV greater than 1.1 g/g.

In an embodiment, such pulps have a CMC viscosity in a range of 56 cP to 130 cP.

In an embodiment, the pulps of the present disclosure include linters pulps, such as CLPs, having an R18 value of 99% or greater, and a WRV in a range between 0.6 g/g and 0.8 g/g. As shown in EXAMPLE 10 and TABLE 7, crosslinked CLPs prepared as discussed further herein with respect to Samples 3A and 3B in accordance with embodiments of the disclosure can have relatively high R18 values, such as 99% or greater and relatively low WRV, such as in a range of 0.6 g/g to 0.8 gig.

A high value pulp product with high ether viscosity and ether viscosity consistency may have a WRV less than starting pulp, As above, in certain embodiments, the pulps of the present disclosure include pulps suitable to make high-viscosity ethers and, as discussed further herein, highly consistent high-viscosity ethers, wherein the WRV of the pulp is less than that of an uncrosslinked feedstock pulp. It was surprisingly discovered that such pulps can produce high-viscosity ethers with high viscosity consistency even at relatively low WRV, such as WRV below a WRY of a feedstock pulp used to make the crosslinked pulps of the present disclosure. So long as the WRV of the crosslinked pulp was high enough to allow the pulp to be converted into a high-viscosity ether the crosslinked pulp may have a relatively low WRV, such as in a range of about 0.6 g/g to about 0.8 g/g. Without being bound by theory it is believed that crosslinking increased pulp reactivity, such as measured by formation of soluble CMC with expected DS, at molecular level due to introduction of crosslinker between cellulose molecules and opening of molecular structure.

Hemicellulose Content

In an embodiment, the pulps of the present disclosure have a hemicellulose of about 6 wt. % by dry mass or greater (for example, greater than or equal to 10 wt. %, 15 wt. %, or 20 wt. %). In an embodiment, the pulps of the present disclosure include hemicellulose in a range from about 6 wt. % by dry mass to about 30 wt. % by dry mass. In an embodiment, the pulps of the present disclosure include hemicellulose in a range from about 9 wt. % by dry mass to about 20 wt. % by dry mass. In an embodiment, the pulps of the present disclosure include hemicellulose at about 15 wt. %.

As discussed further herein with respect to the methods of the present disclosure, hemicellulose is one metric of overall pulp processing efficiency. Generally speaking, pulps with higher hemicellulose content (defined as the sum of xylan and mannan in this application) have higher yields due to the increased bulk provided by hemicellulose. As discussed further herein with respect to EXAMPLE 11 and TABLE 8, pulps in accordance with the present disclosure and prepared according to the methods of the present disclosure have relatively high hemicellulose contents, such as greater than 6 wt. %. As described, pulps crosslinked at consistencies greater than 30%, such as those according to the methods described further herein with respect to EXAMPLE 1, have hemicellulose contents greater than 6 wt. %. Particularly, pulps prepared according to the methods of Sample 2A have a hemicellulose content of about 16 wt. %.

In an embodiment, the pulp is a kraft pulp. As discussed further herein with respect to the methods of the present disclosure, kraft pulp processing generally speaking does not significantly reduce hemicellulose content from starting feedstock hemicellulose content. By utilizing a modified kraft process including high-consistency crosslinking, the crosslinked pulps of the present disclosure have, for example, high hemicellulose contents (and the attendant pulp bulk that comes with high hemicellulose content), as well as high R18 values. In this regard, such pulps are suitable for making high-grade cellulose ether products at relatively low cost.

While kraft pulps are discussed herein, it will be understood that pulps of the present disclosure include other crosslinked pulps, such as CLPs, straw pulps, and the like.

Weight Average Molecular Weight

In an embodiment, the pulps of the present disclosure have a resultant CMC weight average molecular weight greater than about 800 kilodalton (kDa), such as greater than or equal to 1,000 kDa, 1,500 kDA, 2,000 kDa. In an embodiment, the pulp has a resultant CMC weight average molecular weight in a range of about 900 kDa to about 4,000 kDa. In an embodiment, the pulp has a resultant CMC weight average molecular weight in a range of about 1,000 kDa to about 2,500 kDa.

As shown in TABLE 1, CMC made from pulps in accordance with embodiments of the present disclosure have weight average molecular weights greater than 800 kDa, such as greater than 1,000 kDa and greater than 2,000 kDa. This is in contrast to CMC made from conventionally available pulps, such as CLPs, DWP sulfite pulps, and conventional kraft pulps. See also TABLE 1.

As discussed further herein with respect to resultant CMC PDI, the increased resultant weight average molecular weight of CMC made by methods in accordance with embodiments of the disclosure is due to crosslinking of the pulps. As also discussed herein with respect to resultant CMC PDI, such increased weight average molecular weight provides higher strength, elasticity, and shear thinning to resultant CMCs when compared with CMCs prepared from lower molecular weight pulps.

Crosslinkers

The pulps of the present disclosure include crosslinked cellulose fibers including a crosslinker coupled to one or more cellulose fiber.

In an embodiment, the crosslinker forms an ether bond with the one or more cellulose fiber. As discussed further herein with respect to the methods of the present disclosure, such ether crosslink bonds are typically stronger than certain other crosslink bonds, such as ionic crosslink bonds and/or ester crosslink bonds. Such stronger crosslink bonds are generally more resistant to reactions in further pulp processing, such as in etherification reactions.

In an embodiment, the crosslinker is present in a weight ratio relative to other pulp components of greater than or equal to 2:100, greater than or equal to 3:100, greater than or equal to 5:100, or greater than or equal to another suitable lower threshold. The upper threshold can be a maximum amount of crosslinker that can be used without causing resultant CMC from the pulp to become insoluble in water.

Suitable crosslinkers include ethers, such as glycidyl ethers having two or more glycidyl groups. For example, the crosslinker can include a first glycidyl group, a second glycidyl group, and either three or four linear chain carbon atoms between the first and second glycidyl groups. In an embodiment, the crosslinker includes three or more glycidyl groups. In addition or alternatively, the crosslinker can have weight average molecular weight less than or equal to 500 (e.g., within a range from 174 to 500). Furthermore, when the crosslinker is an epoxide, the crosslinker can have a weight per epoxide less than or equal to 175 (e.g., within a range from 140 to 175). The crosslinker can have a viscosity of less than or equal to 500 cP at 25° C. In at least some embodiments, the crosslinker is at least partially insoluble in water. This property can be useful, for example, to increase contact between the crosslinker and cellulose fibers during the crosslinking reaction. Specific examples of suitable crosslinkers include trimethylolethane triglycidyl ether, 1,4-butanediol diglycidyl ether, glycerol diglycidyl ether, neopentyl glycol diglycidyl ether, glycerol polyglycidyl ether, glycerol triglycidyl ether, ethyleneglycol diglycidyl ether, and trimethylol propane triglycidyl ether, among others.

Resultant CMC Testing Method

Throughout this disclosure, the properties of pulp may be characterized in terms of "resultant CMC" properties. These are properties of CMC that the pulp can be used to produce, with CMC serving as a representative example of a cellulose derivative. It should be understood that CMC is not the only cellulose derivative that pulps in accordance with embodiments of the present disclosure may be used to produce. Resultant CMC properties of a given pulp described herein are determined by the following procedure. Additional details regarding this procedure can be found in Nevell T. P. and Zeronian S., Cellulose Chemistry and its Applications, Chapter 15-Cellulose Ethers (1985), which is incorporated herein by reference in its entirety.

First, decide a degree of substitution (DS) of the CMC. If the DS of the CMC is at least 1.0, proceed as specified below. If the DS of the CMC is less than or equal to 1.0, proceed as specified below, but use 2.73 g (instead of 3.6 g) of monochloroacetic acid (MCA).

Slurry 3 OD g of the pulp (fiberized) having approximately 92 wt. % solids in 80 mL isopropanol. Add 8.0 mL of 30 wt. % NaOH (aq) solution over a 3-minute period. Stir the suspension for 1 hour at 20° C. Add 2.73 g of MCA (as 15.2 mL of 20.7 wt % MCA solution in isopropanol) over a 3-minute period. Raise the temperature to 55° C. in 25 minutes and continue stirring for 3.5 hours. Filter the resulting fibrous CMC and wash with 100 ml of 70% ethanol (v/v) (aq). Bring the sample to neutrality (pH 7.0) with acetic acid and then filter. Wash the filter cake again with 100 ml of 70% ethanol (v/v) (aq) at 20° C. and filter. Repeat washing and filtering for one more wash with 100 ml of 70% ethanol (v/v) (aq) at 20° C. and then for 3 more washes with 100% denatured ethanol at 20° C. Air dry the sample to 70-85% solids. Dissolve the air-dried CMC fibers in DI water with strong mixing (Waring blender, 3 rounds of mixing with each mixing time of one minute) to make a 0.5 wt % solution.

Test the 0.5 wt. % CMC solution with a Brookfield viscometer using spindle 2 and 50 RPM at 20° C. according to ASTM method D2196-99 to determine resultant CMC viscosity.

Cellulose Ether Products

In another aspect, the present disclosure provides a cellulose ether product comprising a crosslinked cellulose ether having a viscosity greater than about 56 cP. In an embodiment, the cellulose ether products of the present disclosure have a viscosity of 90 cP. In an embodiment, the cellulose ether products of the present disclosure have a viscosity in a range of about 100 cP to about 400 cP. In an embodiment, the cellulose ether products of the present disclosure have a in a range of 90 cP to 130 cP, as shown in TABLE 1 and discussed further herein with respect to EXAMPLE 1. In an embodiment, the cellulose ether products of the present disclosure have a viscosity of about 100 cP to about 300 cP, as shown in TABLE 2 and discussed further herein with respect to EXAMPLES 2 and 3.

In an embodiment, the cellulose ether product is formed from a pulp of the present disclosure. As discussed further herein, in certain embodiments the pulps of the present disclosure are low-cost pulps, such as kraft pulps. As discussed further herein, because of certain aspects of the methods of the present disclosure, such as high-consistency crosslinking, and as a result of certain properties of the pulps of the present disclosure, such as pulp R18 values, water retention values, and the like, such pulps are suitable to make high-grade, high-viscosity cellulose ether products.

In an embodiment, the cellulose ether product is a crosslinked CMC. While CMC are discussed herein, it will be understood that cellulose ether products of the present disclosure include other cellulose ether products. Accordingly, in an embodiment, the crosslinked cellulose ether product is selected from the group consisting of crosslinked methyl cellulose, crosslinked CMC, crosslinked hydroxypropyl methylcellulose, crosslinked hydroxylethyl cellulose and combinations thereof.

In an embodiment, the cellulose ether products of the present disclosure have a weight average molecular weight greater than about 800 kDa, such as greater than or equal to 1,000 kDa, 1,500 kDA, 2,000 kDa. In an embodiment, the cellulose ether product has a weight average molecular weight in a range of about 900 kDa to about 4,000 kDa. In an embodiment, the cellulose ether product has a weight average molecular weight in a range of about 1,000 kDa to about 2,500 kDa.

In certain embodiments, the cellulose ether products of the present disclosure have a PDI of greater than or equal to about 3. In an embodiment, the cellulose ether products of the present disclosure have a PDI of greater than or equal to about 4.5, In an embodiment, the cellulose ether products of the present disclosure have a PDI in a range of 4.5 to about 7. In an embodiment, the cellulose ether products of the present disclosure have a PDI in a range of about 5.0 to about 6.5.

As discussed further herein, the relatively large weight average molecular weight and PDI of the cellulose ether products of the present disclosure provide higher strength, elasticity, and shear thinning than cellulose ethers, such as those prepared from certain conventional pulps, having lower molecular weights and PDI.

In an embodiment, the cellulose ether products of the present disclosure include hemicellulose at about 2 wt. % by dry mass or greater (such as greater than 6 wt. %, greater than 10 wt. %, and the like). In an embodiment, the cellulose ether product includes hemicellulose in a range from about 2.5 wt. % by dry mass to about 20 wt. % by dry mass. In an embodiment, the cellulose ether product includes hemicellulose in a range from about 2 wt. % by dry mass to about 8 wt. % by dry mass. In an embodiment, the cellulose ether product includes hemicellulose at about 12 wt. %. As discussed further herein, such relatively high hemicellulose content provides bulk to the cellulose ether product.

In an embodiment, the cellulose ether product is a CMC and has a hemicellulose content in a range of about 10 wt. % to about 15 wt %. In an embodiment, the cellulose ether product is a CMC and has a hemicellulose content of about 12 wt. %.

In an embodiment, the cellulose ether product is a methylcellulose (MC), such as a hydroxypropyl methylcellulose (HPMC), and has a hemicellulose content in a range of about 2 wt. % to about 8 wt. %.

Blended Pulps

In another aspect, the present disclosure provides blended pulps including a pulp according to the present disclosure and a second pulp. In any embodiment, the second pulp is an uncrosslinked pulp.

In an embodiment, the blended pulp includes an amount of crosslinked pulp of the present disclosure in an amount of greater than 25 wt. %, greater than 50 wt. %, and greater than 75 wt. %.

In an embodiment, the blended pulps of the present disclosure may be characterized by an amount of fiber left undissolved after being contacted by a solvent, such as cupriethylenediamine (cuen). In an embodiment, the blended pulps have greater than 10 wt. %, greater than 15 wt. %, greater than 20 wt. %, greater than 30 wt. % left undissolved after being contacted with cuen. See for example, TABLE 0 and EXAMPLE 13.

As also shown in TABLE 10 and EXAMPLE 13, the blended pulps of the present disclosure have higher curl and kink than pulps not including the pulps of the present disclosure. Further, such curl and kink tend to be in proportion to the proportion of crosslinked pulp of the present disclosure blended therein. Higher curl and kink may be desirable, such as for increasing fiber accessibility during derivatization reactions.

Accordingly, in an embodiment, the present disclosure provides a blended pulp comprising: a first pulp according to any of embodiments of the present disclosure having a first fiber kink value; and a second pulp having a second fiber kink value different from the first fiber kink value. In an embodiment, the fiber kink value is a number of kinks per meter. See, for example, TABLE 10. In another embodiment, the kink value is a kink angle. See also TABLE 10.

In an embodiment, the first pulp has a first pulp R18 value and the second pulp has a second pulp R18 value different than the first pulp R18 value. In a further embodiment, the first pulp is partially soluble in cuen. In certain embodiments, the first pulp is insoluble in cuen.

EXAMPLES

Example 1

High-Consistency Crosslinking of Pulps and Carboxymethyl Cellulose Made Therefrom The present example demonstrates an improved process for crosslinking pulps that includes the use of high-consistency mixers, such as Andritz™ and Loedige™ mixers, to make very-high-viscosity pulp from both SW and HW pulp. The high viscosity pulp can replace expensive, high-viscosity CLP or wood pulp in the market for cellulose derivative applications. These high-consistency reactors can further reduce chemical usage significantly.

As discussed further herein, the experimental samples 2A-2C, are compared with commercially available CLP, DWP sulfite pulp as prepared in U.S. Pat. No. 9,771,687 which is incorporated herein by reference in its entirety, and commercially available NB416 pulp. As shown in TABLE 1, samples 2A-2C have high hemicellulose concentrations, high weight average molecular weights, high PDI, and high resultant CMC viscosities in comparison to the conventionally available pulps.

Sample 2A

The starting material for preparing crosslinked pulp in this example was dried, bleached NB416 pulp from New Bern mill, International Paper Company. The pulp was dispersed in water in a pulper (5% solids) at 90° C. (heated by steam) to form a slurry, which was diluted to 4 wt. % solids in the feed tank. The resulting slurry was twin wire pressed to 40 wt. % solids. The pulp was approximately 65° C. coming off the twin wire press and was pin milled in line. The warm pulp was fed into an Andritz™ high-consistency mixer at a rate of 10 OD kg/minute rate and mixed with 5 wt. % NaOH (aq) and 20 wt. % Heloxy 48/80 wt. % water emulsion (with a gear pump) at the same time. The Heloxy 48 emulsion was prepared by blending the Heloxy 48 with DI water under high speed mixing (using lighting mixer or a blender). Heloxy 48 was in the form of an emulsion and was prepared by mixing Heloxy 48 in DI water under high speed mixing. NaOH and Heloxy 48 addition on oven-dried pulp are 2 wt. % and 5 wt. % respectively. Pulp mixed with chemicals was steamed to maintain a temperature at about 75° C. and was discharged to a storage tower in which temperature was maintained at 75° C. with steam. The pulp mixture in the tower had a consistency of about 30%-38% and pulp residence time in the tower is 60 minutes. After a 60-minute residence time, the pulp was discharged from the tower at a rate of 10 OD kg/minute and collected in a tank for neutralization with acetic acid (pH 4.5-5.0, 3% pulp consistency, and 10-15C). The neutralized pulp was pressed to about 40% solids for further processing (forming rolls with paper machine at a sheet density between 0.50 g/cm³ to 0.80 g/cm³ and air dried as flakes for lab testing). This pulp has a pulp R18 value of 93%.

A CMC sample was prepared from the crosslinked pulp as described elsewhere herein. 0.5 wt. % CMC solution viscosity was 128 cP (DS 0.95 from using 8 ml 30 wt. % NaOH (aq) and 2.73 gram MCA as described as described elsewhere herein). All CMC viscosities were determined with a Brookfield viscometer using spindle 2 and speed 50 RPM. NB416 starting pulp had 0.5 wt. % CMC (DS 0.95) viscosity of about 33 cP.

For GPC, the CMC samples were delivered as approximately 0.5 mg/mL solutions in water. Because of relative high viscosity of the solutions 10 mL of the delivered solutions were diluted to 25 mL with ultrapure water. This corresponds to sample concentrations of approximately 2 mg/mL. After dilution the clear solutions were filtered by 1 μm Nylon membranes. Every CMC sample solution was injected two times. The average molar masses, weight average molecular weight ($M_w$) and molecular weight distribution (MWD) or PDI of the investigated samples are summarized in the TABLE 1.

MWD of CMC solution for Samples 2A above, 2B, 2C, 3A-3C and 4A-4C below were analyzed with gel permeation chromatography-multi-angle light scattering (GPC-MALS).

GPC experimental set-up was as follows:

Equipment:
Separation module Alliance 2695, (Waters)
Refractive Index Detector 2414, (Waters)
Laser photometer Dawn-HELEOS (Wyatt Technology Inc.) wavelength λ, =658 nm and KS flow cell
PC-controlled, Empower-software 3, (Waters)
Evaluation of GPC-MALS with Astra-software 5.3.4.20 (Wyatt Technology Inc.)

GPC-conditions:
GPC-column set: Suprema; (Polymer Standards Service GmbH PPS)
GPC-Oven temperature: 30° C.
Eluent: ultrapure water with 0.2 m $NaNO_3$
Flow rate: 0.8 mL/min
Detector: RI (30° C.)
Laser photometer Dawn Heleos, 658 nm
Injection volume: 100 μl
Sample concentration: approx. 0.2 mg/mL, dn/dc at 0.163 mL/g Sample 2B The starting material for preparing crosslinked pulp for this sample was dried, bleached NB416 pulp from New Bern mill, International Paper Company. The pulp was dispersed in water in a pulper (5 wt. % solid) at 90° C. (heat by steam) to form slurry (4 wt. % solid in feed tank), which was twin wire pressed to 40 wt. % solids. The warm pulp was fed into an Andritz™ high-consistency mixer at a rate of 10 (OD) kg/minute rate and mixed with 5.0 wt. % NaOH (aq) and 20 wt. % Heloxy 48/80 wt. % water emulsion (with a gear pump) at the same time. NaOH and Heloxy 48 addition on oven-dried pulp are 1 wt. % and 4 wt. %, respectively. Pulp mixed with chemicals was steamed to maintain a temperature at about 65° C. and was pumped to a storage tower with temperature control at about 65° C. Pulp mixture in the tower had a consistency of about 30%-38% and a pulp residence time in the tower of about 60 minutes. After a 60-minute residence time, pulp was discharged from the tower at a rate of 10 (OD) kg/minute and collected in a tank for neutralization (pH 4.5-5.0). Neutralized pulp was pressed for further process or air-dried. A CMC sample was prepared from the pulp as described elsewhere herein.

A 0.5 wt. % CMC (DS 0.95) solution viscosity was 71 cP. The starting NB416 pulp had 0.5 wt. % CMC (DS 0.95) viscosity of about 33 cP.

Sample 2C

The starting material for preparing crosslinked pulp for this sample was dried, bleached NB416 pulp from New Bern mill, International Paper Company. The pulp was dispersed in water in pulper at 20° C., centrifuged to 40 wt. % solids and pin mill fluffed. 26.8 kg (10 OD kg) wet pulp (20° C.) was fed into a Loedige™ high-consistency reactor (10 kg/batch) and the temperature was increased to 75° C. (with mixing). 0.2 kg NaOH (aq) (50 wt. %) was first injected to the pulp in the reactor in 15 seconds, followed by injecting 1 kg of warm water. Then 2 kg 20 wt. % Heloxy 48/80 wt. % emulsion was injected to the mixture, followed by 1 kg warm water. There were two minutes between each injection and the injection time was 15 seconds. NaOH (aq) and Heloxy 48 emulsion addition to pulp (OD) are 1 wt. % and 4 wt. %, respectively (one can mix/inject caustic, Heloxy 48 and water at the same time to achieve similar results). Pulp mixture with chemicals was mixed inside reactor for 5 minutes at high speed and for 55 minutes at slow speed at 75° C. for 60 minutes. Pulp mixture in the reactor had a consistency of about 32%. After a 60-minute residence time, the pulp mixture was neutralized with acetic acid and discharged for washing. Washed pulp was dried and CMC was prepared from the sample as described elsewhere herein. 0.5 wt. % CMC (DS=0.95) solution viscosity from the sample was 95 cP. The starting NB416 pulp had 0.5 wt. % CMC (DS=0.95) viscosity of about 33 cP.

Sample 2C1

The above Sample 2C was repeated except never dried NB416 from New Bern mill was mixed with the chemicals. The final pulp consistency was 32% and a 0.5 wt. % CMC (DS=0.95) solution viscosity from the pulp was 110 cP. 0.5 wt. % CMC solution viscosity from the pulp was 298 cP if the DS was 1.25 (8 ml 30 wt. % NaOH (aq) and 3.6 gram of MCA as described elsewhere herein).

slurry was washed with DI water, neutralized with acetic acid, washed with DI water again, and dried in 85° C. oven for testing.

Sample 3B (Part B: ~166 gram. 6.64 gram pulp)

Pulp slurry part B was filtered to remove as much as caustic as possible (~141 gram). Then, some filtrate (6 gram) and 2.6 gram of 10 wt. % H48/90 wt. % emulsion were mixed, and then added to the pulp/caustic mixture (Part B after filtration) in the bag to a final weight of about 33 gram (3.92 wt. % H48 on pulp, ~20% pulp consistency). The mixture in the bag was hand mixed thoroughly, and the bag was placed in the 35° C. oven and the temperature was increased to 50° C. in five minutes. The temperature was maintained for 40 minutes (50° C. oven). After 40 minutes, the pulp slurry was washed, neutralized, washed again, and dried for testing as described in 3A.

Sample 3C (Part C: ~166 gram, 6.64 gram pulp)

Pulp slurry part C was filtered to remove caustic (133 gram removed). Then, 133 gram of DI water was added to the pulp and the mixture was mixed. Then 141 grams of liquid was filtered out again (new filtrate). Now the mixture had lower caustic concentration. Then some new filtrate (6 gram) and 2.6 gram of a 10 wt % H48/90 wt. % water

TABLE 1

High-consistency kraft pulp and CMC properties

| | Pulp properties | | | Crosslinking condition | | | CMC (DS = 1.0) properties | | | | |
|---|---|---|---|---|---|---|---|---|---|---|---|
| Sample | Pulp viscosity (SCAN ml/g) | Xylan in pulp (wt. %) | Mannan in pulp (wt. %) | Pulp consistency (%) | NaOH concentration (wt. %) | Crosslinking temperature (° C.) | 0.5 wt. % CMC viscosity (cP) | Xylan in CMC (wt. %) | Mannan in CMC (wt. %) | PDI | $M_W$ (kDa) |
| Control (CLP) | 1589 | 0.45 | 0.28 | — | — | — | 55 | <0.09 | <0.09 | 1.6 | 397 |
| DWP sulfite 2 | 1435 | 3.3 | 1.7 | — | — | — | 56 | 1.23 | 0.70 | 1.9 | 331 |
| NB416 (control) | 900 | 10.3 | 6.90 | — | — | — | 33 | 7.47 | 3.30 | 2 | 144 |
| 2A (Andritz) | R18 = 93% | 9.94 | 6.90 | 30-38 | 4 | 75 | 128 | 7.36 | 3.20 | 6.5 | 2260 |
| 2B (Andritz) | — | 10.0 | 6.87 | 30-38 | 2 | 75 | 71 | 7.44 | 3.17 | 5.0 | 1160 |
| 2C (Loedige) | — | 10.2 | 6.50 | 32 | 2 | 75 | 95 | 7.70 | 4.47 | 5.7 | 1080 |

Example 2

Method for Making a Crosslinked Pulp Including High-Consistency Crosslinking and Caustic Extraction The present example demonstrates a method for preparing a crosslinked pulp using high-consistency crosslinking of CLPs. As shown, resultant CMCs have, for example, high viscosities, molecular weights, and PDI.

20 gram CLP with SCAN viscosity of 1589 ml/g was placed in a plastic bag and warmed in an oven at 35° C. The warm CLP was then mixed with 480 gram 8 wt. % NaOH (aq) (warmed to 35° C. in advance) in plastic bag at 35° C. for 15 minutes. The CLP slurry was divided into three equal parts (A, B and C) and each part with equal weight (166 gram with 6.64 gram CLP) was stored in a plastic bag.

Sample 3A (part A: ~166 gram, 6.64 gram pulp)

2.6 gram of 10 wt. % H48/90 wt. % water emulsion were added to the pulp/caustic mixture (Part A) in the bag (3.92 wt. % H48 on pulp, 4% pulp consistency) and the mixture in the bag was hand mixed thoroughly, and the bag was placed in the 35° C. oven and the temperature was increased to 50° C. in five minutes. The temperature was maintained for 40 minutes (50° C. oven). After 40 minutes, the pulp emulsion were mixed, and then added to the above pulp/caustic mixture (Part C with lower caustic concentration) in the bag to a final weight of about 33 gram (3.92 wt. % H48 on pulp, 20% pulp consistency). The mixture in the bag was hand mixed thoroughly, and the bag was placed in the 35° C. oven and the temperature was increased to 50° C. in five minutes. The temperature was maintained for 40 minutes (50° C. oven). After 40 minutes, the pulp slurry was washed, neutralized, washed again, and dried for testing as described in 3A.

0.5 wt. % CMC (DS=1.0) solution viscosity (Brookfield viscometer with spindle 2, speed 50 RPM for all tests) from control, 3A, 3B and 3C are 55 cP, 79 cP, 150 cP, 120 cP, respectively as shown in TABLE 2.

Example 3

Method for Making a Crosslinked Pulp Including High-Consistency Crosslinking and Caustic Extraction at Elevated Temperatures The present example demonstrates a method for preparing a crosslinked pulp using high-consistency crosslinking of CLPs at elevated crosslinking temperatures. As shown, resultant CMCs have, for example, high viscosities, molecular weights, and PDI.

Samples 4A-4C

The test in EXAMPLE 3 (as for Samples 3A, 3B and 3C) were repeated again to make Samples 4A, 4B and 4C, respectively, with the exception that the crosslinking temperature was 75° C. instead of 50° C. 0.5% CMC (DS=1.0) solution viscosity (Brookfield viscometer with spindle 2, speed 50 RPM) from 4A, 4B and 4C are 109 cP, 124 cP, 300 cP, respectively.

The results are listed in the TABLE 2. CMC solutions were analyzed and the data are shown in the TABLE 2.

Conclusion: high-consistency crosslinking raised the viscosity of resultant CMCs at lower cost. See for example, Sample 3B vs Sample 3A and Sample 4B vs Sample 4A. Extraction stage improved quality at higher crosslinking temperature resulting in higher CMC viscosity. See, for example, Sample 4C vs Sample 3C. Further, CMC from both crosslinked wood pulp (EXAMPLE 1) and crosslinked CLP (EXAMPLE 2) using the improved process had much higher solution viscosity, PDI and $M_w$ than crosslinked pulp described in U.S. Pat. No. 9,828,725, which is incorporated by reference herein in its entirety.

TABLE 2

High-consistency kraft pulp and CMC properties

| | Crosslinking condition | | | CMC (DS = 1.0) properties | | |
| --- | --- | --- | --- | --- | --- | --- |
| Sample | Pulp consistency (%) | NaOH concentration (wt. %) | Crosslinking temperature (C.) | 0.5 wt. % CMC viscosity (cP) | PDI | $M_W$ (kDa) |
| 3A | 4 | 8 | 50 | 79 | — | — |
| 3B | 20 | 8 | 50 | 150 | — | — |
| 3C | 20 | 1.4 | 50 | 120 | — | — |
| 4A | 4 | 8 | 75 | 109 | 2.3 | 729 |
| 4B | 20 | 8 | 75 | 204 | 4.7 | 1730 |
| 4C | 20 | 1.4 | 75 | 300 | 6.2 | 2280 |
| US98282725 | DWP Pulp (cold caustic extracted) with low hemicellulose (Xylan or mannan) | | | | <3.0 | <790 |

Example 4

Method of Making Crosslinked Pulps Having R18 Values of Greater than 92%

The present example demonstrates a method of preparing a crosslinked pulp in accordance with an embodiment of the disclosure including sequential dosing of crosslinking reactants. As shown, pulps made according to the present example have high resultant CMC viscosities and high R18 values.

Sample 5A:

The starting material for preparing crosslinked pulp for this sample was dried, bleached NB416 pulp from New Bern mill, International Paper Company. The pulp was dispersed in water in pulper at 20° C., dewatered over a 150 mesh screen, centrifuged to 40 wt % solids and pin mill fluffed. 26.8 kg (OD 10 kg) wet pulp (20° C.) was fed into a Loedige™ high-consistency reactor (10 kg/batch) and the temperature was increased to 75° C. (with mixing at 80 RPM). 0.6 kg NaOH (aq) (50 wt. %) was injected to the pulp in the reactor in approximately 5 seconds, followed by injecting 1 kg of warm water. Then 2.5 kg 20 wt. % Heloxy 48/80 wt. % water emulsion was injected to the mixture, followed by 1 kg warm water. There are two minutes between each injection. NaOH and Heloxy 48 addition to pulp (OD) are 3 wt. % and 5 wt. % respectively. Pulp mixture with chemicals was mixed for 5 minutes together for 55 minutes at 75 wt. % and 120 RPM and the temperature inside reactor was maintained at about 75° C. for 55 minutes at 25 wt. % at 40 RPM. Pulp mixture in the reactor had a consistency of about 32%. After a 60-minute residence time, pulp mixture was neutralized with 0.45 kg acetic acid and discharged for washing with DI water. Washed pulp was dried. R18 of the pulp is 93.7% while starting pulp NB416 has R18 of 88%. CMC was prepared from the sample. A 0.5 wt. % CMC (aq) (DS=1.25) solution viscosity from the sample is 313 cP (calculated pulp SCAN IV is 2304 ml/g, as described further herein). NB416 pulp had 0.5% CMC (DS=1.25) viscosity of about 40 cP.

Sample 5B

Sample 5B was prepared as Sample 5A except that 4.5 kg water was added following pulp addition. The final pulp consistency was 27.5%. The crosslinked pulp had an R18 value of 92.7%. 0.5 wt. % CMC (DS=1.25) viscosity from the pulp was 190 cP.

Sample 5C

Sample 5C was prepared as Sample 5A except that 8.1 kg water was added following pulp addition. The final pulp consistency was 25%. The crosslinked pulp had an R18 value of 92.4%. 0.5 wt. % CMC (DS=1.25) viscosity from the pulp was 170 cP.

Sample 5D

Sample 5B was prepared as Sample 5A except dried Eucalyptus pulp from Mogi mill was mixed with the chemicals (1 wt. % NaOH (aq) and 4 wt. % H48 (aqueous emulsion) on pulp). The final pulp consistency was 32%. Crosslinked pulp had an R18 value of 93.8%. 0.5 wt. % CMC (DS=1.0) solution viscosity from the pulp was 65 cP.

Example 5

Method of Making Crosslinked Pulps Through Application of Caustic and Crosslinker to Dry and Semi-Dry Pulp The present example provides a method of preparing crosslinked pulps including application of crosslinking reactants to dry or semi-dry pulps. As shown, pulps made according to such methods have relatively high R18 values and resultant CMCs have high viscosities without active mixing steps.

A 25-gram (OD) NB421 sheet from New Bern International Paper Company was soaked in a mixture with 6.2 gram Heloxy 48, 4.8 gram of 50 wt. % NaOH (aq), and 157 grams of water for one minute. The soaked pulp sheet was pressed with a stainless roller for several times to provide a final pulp sheet consistency of 42%. The NaOH and Heloxy addition on the pulp is about 2 wt. % and 5 wt. %, respectively. The pressed pulp sheet was divided into two pieces, which were placed in glass beakers with covers (to limit water evaporation) and dried in a 120° C. oven for 10 and 20 minutes. The semi-dried pulp sheets were neutralized and washed before complete drying. The 0.5 wt. % CMC solution from the sheets dried for 10 minutes and 20 minutes had viscosity of 82 cP and 130 cP respectively.

Example 6

Washing pH and Extraction of Caustic in the Filtration of Pulp

The present example demonstrates washing pulps prepared according methods of the present disclosure with low-pH solutions to reduce levels of metals, ash, and silica dispersed in the pulp.

High viscosity kraft pulp was acid washed at pH<7, <6, <5, <4 to remove metals (Ca, Fe, Mn, Ni, Co, Cr, Cu etc.) and to lower ash (any acid can be used to adjust pH) and silica. After acid washing, pulp slurry pH can be adjusted in or before entering head box to pH >4, >5, >6 or >7 to neutralize residual acid. Residual acid in pulp can cause pulp degradation and viscosity loss during final drying (TABLE 3). Pulp viscosity was maintained during the crosslinking reaction. In pilot production, the crosslinked pulp prepared as discussed further herein with respect to Sample 2A was dispersed in water at 3% consistency and slurry pH was adjusted with acetic acid to pH 4.5-5. This washed pulp had similar CMC viscosity as the pulp without acid washing in the pilot (TABLE 2). Pilot-washed pulp produced CMC viscosity higher than CLP with SCAN of 2310 ml/g. These pulps also had low ash, Ca, Fe, silica, etc., as shown in TABLE 3. The pilot-washed sample was finally formed into rolls with headbox pH at around 4.8 (reserve osmosis water and acetic acid used) and these pulp had even lower ash, Ca, Fe, silica etc.

TABLE 3

High-viscosity kraft pulp from pilot production and its properties after washing

| | | A sample (as in Sample 2A) Pilot washed sample (pH 4.5-5.0), then | | CLP Commercial sample |
| --- | --- | --- | --- | --- |
| | | Hot air dried | Roll formed- headbox pH 4.8 | |
| 0.5 wt. % CMC (DS = 1) viscosity | cP | 166 (one sample) | 125 (average of 15 rolls) | 90 |
| SCAN IV (estimate) | ml/g | >2070 | >2070 | 2070 |
| ash | wt. % | 0.14 | 0.06 | 0.10 |
| DCM (extractive) | wt. % | 0.04 | 0.04 | 0.07 |
| Ca | ppm | 132 | 108 | 170 |
| Mg | ppm | 120 | 60 | 66 |
| Na | ppm | 660 | 120 | 180 |
| Fe | ppm | 2.6 | 2.0 | 7.5 |
| Mn | ppm | 0.18 | 0.17 | 0.24 |
| Cu | ppm | 0.10 | 0.12 | 0.28 |
| Silica | ppm | 10 | 9 | 79 |

TABLE 4

Washing pH and water impact on metal contents in the high viscosity pulp: cleaner water (DI water vs city water with Ca at about 10 ppm) and lower pH (with added acetic acid) can remove more Ca and other metals

| | Pulp washing condition | | | |
| --- | --- | --- | --- | --- |
| PH | 4.0 (DI water) | 5.3 (DI water) | 4.2 (City water) | 6.8 (City water) |
| | Pulp metal content | | | |
| Calcium ppm | 68.3 | 94.1 | 169.6 | 507.0 |
| Copper ppm | 0.06 | 0.05 | 0.08 | 0.05 |
| Manganese ppm | 0.23 | 0.28 | 0.42 | 1.12 |
| Iron ppm | 1.26 | 0.8 | 0.87 | 1.15 |
| Magnesium ppm | 5.26 | 7.34 | 13.16 | 34 |

Example 7

Crosslinked Eucalyptus Pulps from High-Consistency Pulps with Washing and Reuse of Caustic The above Sample 5D was repeated except dried mixed hardwood from Saillat mill, International Paper, was mixed with the chemicals (1 wt % NaOH (aq) and 4 wt. % H48 (aqueous emulsion) on pulp). The final pulp consistency was 32%. Crosslinked pulp had an R18 value of 94.1%. 0.5 wt. % CMC (DS=1.0) solution viscosity from the pulp was about 63 cP, 50 cP, 40 cP when the crosslinked pulp was washed at pH 4, 3, and 2, respectively. It is noted that washing pulp at too low a pH can degrade pulp.

To enhance pulp washing and effluent treatment, high-viscosity pulp from the crosslinking reactor can be diluted from >30 wt. % solid to 10 wt. % or less (with process water or acidic water from the mill). Diluted slurry was pressed to high consistency while releasing filtrate with residual caustic, crosslinker etc. The caustic in the filtrate can be reused in pulping and bleaching state and any organic chemicals in the filtrate may be degraded during re-use too. Pressed pulp was diluted again with acidic water to low pH to remove metals (Ca, Fe, Cu, Mn, Mg, etc.) before sending to stock. The stock was used to form pulp rolls or bale with possible pH adjustment at formation stage like in headbox (for example, headbox pH can be from 4 to 8).

Example 8

Methylcellulose from High-Viscosity Pulp

Cellulose (CELL) pulp was ground to powder and was suspended in diethyl ether (DEE) and a 50 wt. % NaOH (aq) solution was added. After the alkalization at room temperature, methyl chloride (MeCl) was added into the reactor and the temperature was increased to 85° C. The reaction time was 2 hours at this temperature. After cooling, the mixture was recovered by vacuum filtration, neutralized, and washed four times with hot water. By adding, propylene oxide (PO), hydroxylpropylmethyl cellulose (HPMC) was also prepared (TABLE 5).

For the determination of the DS and the distribution of substituents in the AGU of derivatized cellulose, the samples were hydrolyzed with trifluoroacetic acid, dissolved in $D_2O$, and analyzed with high-resolution liquid $^{13}C$-NMR. See TABLE 5. The measurements occurred at 100 MHz in a 400 MHz spectrometer (Varian) with a quantitative method without Nuclear-Overhauser effect. (Refer "Characterization of cellulose and cellulose derivatives in solution by high resolution $^{13}$C-NMR spectroscopy". I. Nehls, W. Wagenknecht, B. Philipp, D. Stscherbina, *Prog. Polym. Sci.,* 1994, 19, 29-78).

The viscosity of a 2 wt. % aqueous solution was measured using a rotary viscometer (VT550, Haake) with a conical cylinder (MV-DIN) at 20'C. The shear viscosity was determined at a shear rate of =2.55 s$^{-1}$.

TABLE 5

HPMC and MC preparation conditions and their properties

| Sample | PO/ Cell Molar ratio | MeCl/ Cell Molar ratio | NaOH/ Cell Molar ratio | DEE/ Cell Weight ratio | Alkalization Minute | Maximum pressure Bar | DS (HP) NMR | DS (M) NMR | pH | Viscosity cP | Gelation C |
|---|---|---|---|---|---|---|---|---|---|---|---|
| NB421 | 0 | 5.5 | 3.4 | 26.7 | 90 | 5.0 | | | | | |
| CLP | 0 | 6.6 | 3.4 | 17.8 | 90 | 5.75 | | 1.77 | 6.8 | 203 | 0.4 |
| Sample 5A | 1.0 | 1.0 | 3.4 | 14.3 | 90 | 6.40 | 0.1 | 1.23 | 5.1 | 110 | 76.3 |

Example 9

CMC Viscosity Coefficients of Variability

The present disclosure demonstrates the methods described herein provide pulps useful in preparing CMC with viscosities having low coefficients of variability (COV) compared conventionally available CMCs.

The preparation of and characteristics of comparative pulp Kraft B are described in Experimental Example 13 and Table 12 of U.S. Pat. No. 9,771,687, which is hereby incorporated by reference in its entirety. The preparation of and characteristics of pulp comparative Kraft A are described in Experimental Example 8 and Table 8 of U.S. Pat. No. 9,771,687.

TABLE 6A

CMC COV from previous pulps having lower consistency

| Sample | Hemicellulose (wt. %) | WRV (g/g) | CMC viscosity (cP) DS = 0.90-1.00 | CMC viscosity (cP) As measured in U.S. Pat. No. 9,771,687 |
|---|---|---|---|---|
| Kraft B | 15 | 1.35 | 108-110* | 413-435 |
| Kraft A | 15 | | 82* | 196 |

*As measured according the methods described further herein.

The CMC viscosity COV Samples Kraft A and Kraft B is 38%.

Using equipment and conditions as described further herein for Sample 2C, several batches of crosslinked pulp were prepared and the resultant CMC viscosity had a CMC COV from 20 to 36%. See TABLE 6B. In this regard, higher-consistency crosslinking provides a more uniform reaction environment, and accordingly CMC viscosity COV is much lower.

TABLE 6B

CMC from pulps of the present disclosure mixed with a Loedige ™ mixer

| Batch | CMC viscosity (cP) | NaOH (wt. %) | Crosslinker (wt. %) |
|---|---|---|---|
| 1 | 103 | 2 | 5 |
| 2 | 61 | 2 | 5 |
| COV | 36.2 | | |

TABLE 6B-continued

CMC from pulps of the present disclosure mixed with a Loedige ™ mixer

| Batch | CMC viscosity (cP) | NaOH (wt. %) | Crosslinker (wt. %) |
|---|---|---|---|
| 3 | 54 | 1 | 4 |
| 4 | 72 | 1 | 4 |
| COV | 20.2 | | |

Further, using equipment as described further herein with respect to Samples 2A and 2B (except that NaOH and crosslinker are 2 wt. % and 3.5 wt. % on pulp, respectively), several batches of crosslinked pulp were prepared and the resultant CMC viscosity had lower still CMC COV from 10% to 12%. See TABLE 6C.

TABLE 6C

CMC from pulps of the present disclosure mixed with an Andritz ™ mixer

| Batch | Sample 2A CMC viscosity (cP) | Sample 2B CMC viscosity (cP) | Sample 2A CMC viscosity (cP) |
|---|---|---|---|
| 1 | 102 | 58 | 166 |
| 2 | 140 | 61 | 147 |
| 3 | 120 | 69 | 127 |
| 4 | 122 | 66.4 | 135 |
| 5 | 106 | 81 | 156 |
| 6 | 123 | 62.4 | 120 |
| 7 | 116 | 68 | |
| 8 | 118 | 57 | |
| 9 | 102 | | |
| 10 | 113 | | |
| 11 | 114 | | |
| 12 | 99 | | |
| 15 | 136 | | |
| STDEV | 12.5 | 7.7 | 17.0 |
| Average | 116.2 | 65.4 | 143.8 |
| COV | 10.8 | 11.8 | 11.8 |
| Average R18 (%) | 93.0 | 92.2 | 93.0 |

Example 10

Water Retention Values of Pulps of the Present Disclosure

Due to process optimization, crosslinked pulp had higher crosslinking density and reduced WRY.

TABLE 7

CMC viscosity, Pulp Water Retention Values and R18 Values

| | Sample Preparation | 0.5 wt. % CMC Viscosity (cP) | R18 (%) | WRV (g/g) |
|---|---|---|---|---|
| Starting pulp, Dry NB416 | | 33 | 87 | 0.958 |
| Crosslinked dry NB416 | 2A | 120 | 93 | 0.962 |
| Crosslinked dry NB416 | 2A | 120 | 93 | 0.936 (duplicate) |
| Crosslinked dry NB416 | 2C* | 128 | 93.5 | 0.944 |
| Starting never dried NB416 | | 33 | 87 | 1.085 |
| Crosslinked NB416 | 2C1** | 95 | 92.5 | 0.876 |
| Starting dry HW pulp | | 23 | 93.1 | 0.941 |
| Crosslinked HW pulp | 7B | 63 | 94.1 | 0.894 |
| Starting never dried NBSK | | <30 | 87 | 1.167 |
| Crosslinked NBSK pulp | 2C1 | 60 | 87.4 | 1.216 |
| Starting dry NBSK pulp | | <30 | 87 | 1.076 |
| Crosslinked NBSK pulp | 2C | 60 | 87.7 | 1.022 |
| Crosslinked NBSK pulp | 2C* | 88 | 90.0 | 1.048 |
| Starting dry SW pulp | | <30 | 87 | 0.858 |
| Crosslinked SW pulp (like 2C) | 2C | 56 | 89.7 | 0.976 |
| Crosslinked SW pulp | 2C* | 112 | 91.7 | 0.987 |
| Starting dry CLP | Lab | 55 | 99.1 | 0.729 |
| Crosslinked CLP | 3A | 79 | 99.5 | 0.66 |
| Crosslinked CLP | 3B | 150 | 99.7 | 0.68 |
| Crosslinked CLP | 3C | 120 | 100 | 0.68 |
| Crosslinked CLP | 4C | 300 | 99.8 | 0.68 |

*2 wt. % NaOH and 5 wt. % crosslinker on dry pulp.
**40 minute.

Example 11

Hemicellulose Content of the Pulps of the Present Disclosure

The present disclosure demonstrates hemicellulose levels of pulps made according to methods of the present disclosure.

Crosslinked pulps and CMCs were prepared as described further herein with respect to Sample 2A in EXAMPLE 1.

HPLC was used to detect sugar monomer in hydrolyzed pulp and ether. Main sugars like glucose, xylose and mannose can be detected and the corresponding glucan, xylan and mannan contents can be calculated. Due to derivatization, sugar wt in the ether is less than in cellulose pulp. Xylan ratio is calculated as percent of xylan in the sum of glucan, xylan and mannan. Mannan ratio is calculated as percent of mannan in the sum of glucan, xylan and mannan. Hemicellulose percent is the sum of xylan ratio and manna ratio.

As shown in TABLE 8, the crosslinked pulp samples had a hemicellulose wt. % in a range of 10 wt. % to 20 wt. %, CMC made therefrom had a hemicellulose wt. % of about 12 wt. %, and MC made therefrom had a hemicellulose wt. % in a range of 2 wt. % to 8 wt. %.

TABLE 8

Hemicellulose in the Pulp, Crosslinked Pulp, and Ether

| | GLUCAN tested wt. % | XYLAN tested wt. % | MANNAN tested wt. % | Xylan-A Xylan ratio wt. % | Mannan-A Mannan ratio wt. % | Hemicellulose Xylan ratio plus mannan ratio wt. % | DS | Viscosity cP |
|---|---|---|---|---|---|---|---|---|
| NB416 Crosslinked pulp | 83.0 | 10.3 | 6.90 | 10.3 | 6.9 | 17.2 | | |
| Sample 2A | 72.2 | 7.39 | 6.08 | 8.63 | 7.10 | 15.72 | | |
| Sample 2A CMC | 69.6 | 7.47 | 6.13 | 8.98 | 7.37 | 16.35 | CMC | CMC |
| Sample 2A MC (HPMC), see TABLES 5 and 7 | 19.4 | 1.83 | 0.84 | 8.26 | 3.79 | 12.05 | 0.92 MC | 128 MC |
| CLP | 8.78 | 0.09 | 0.09 | 1.00 | 1.00 | 2.01 | 1.77 | 203 |
| Sample 5A | 21.4 | 0.95 | 0.58 | 4.14 | 2.53 | 6.67 | 0.99 | 174 |
| NB421 | 19.8 | 0.44 | 0.10 | 2.16 | 0.49 | 2.65 | 1.33 | 115 |
| Sample 2C1 | 27.7 | 1.52 | 0.65 | 5.09 | 2.18 | 7.26 | 1.53 | 1800 |

Example 12

Alkaline Ion Coefficient of Variability of Pulps of the Present Disclosure

During crosslinking, the pulps described herein have a high consistency. Accordingly, alkaline ions, such as sodium ions, dispersed therein are more evenly distributed due to improved mixing methods than in pulps conventionally crosslinked at lower consistencies with poorer mixing. In the present example sodium is from NaOH, which is mixed with crosslinker and pulp for crosslinking. Sodium ion concentration COV is one metric for the effectiveness of mixing.

As shown in TABLE 9 below, pulps made according to the methods of the present disclosure have low sodium ion concentration COV, such as less than 5. Wet pulp samples were pulled from the crosslinking reactor and dried for metal analysis.

TABLE 9

Ion concentration in pulp samples

|  | Ca (mg/kg) | Mg (mg/kg) | Na (mg/kg) |
|---|---|---|---|
| G1 | 287 | 244 | 9100 |
| G2 | 265 | 249 | 10200 |
| G3 | 260 | 242 | 9390 |
| G4 | 290 | 251 | 9460 |
| G5 | 288 | 241 | 9260 |
| STDEV | 14.3 | 4.4 | 424.2 |
| Average | 278.0 | 245.4 | 9482.0 |
| COV | 5.1 | 1.8 | 4.5 |

Example 13

Blended Pulps

Blended pulps including pulps of the present disclosure were prepared by blending a crosslinked pulp of the present disclosure with an uncrosslinked pulp, here NB416.

A shown in the TABLE 10 below, the blended pulps had a higher kink angle and a greater proportion of fiber undissolved in a solvent, such as cuen. Further, such blended pulps had a higher curl percentage as well as kink.

TABLE 10

Blended Pulps

Valmet Fiber Analysis for crosslinked pulp (CP) and fluff pulp (NB416) and undissolved fiber

| Pulp CP/NB416 | Length (L) ISO mm | Fiber width μm | curl % | kink l/m | kink angle degree | Undissolved fiber in Cuen | 0.5 wt. % CMC viscosity cP |
|---|---|---|---|---|---|---|---|
| 100 wt. %/0 wt. % | 2.09 | 23.05 | 53.66 | 2634.2 | 39.3 | 31.4 | 126 |
| 75 wt. %/25 wt. % | 2.18 | 22.39 | 34.54 | 1940.1 | 36.7 | — | 90 |
| 50 wt. %/50 wt. % | 2.18 | 22.22 | 29.94 | 1762.6 | 36.2 | 17.0 | 59 |
| 25 wt. %/75 wt. % | 2.18 | 22.15 | 25.12 | 1656.7 | 35.5 | — | 46 |
| 0 wt. %/100 wt. % | 2.18 | 21.75 | 27.32 | 1563.9 | 35.8 | 0.0 | 32 |
| 100 wt. % Hardwood | 0.82 | 12.60 | 14.68 | 1550.3 | 38.3 | 0.0 | 23 |

Example 14

Multiple Crosslinker Dosing

A pulp made according the methods discussed further herein with respect to sample 2A (treated with 5 wt. % crosslinker) was crosslinked a second time with a total crosslinker dosage at 15-20 wt. %. As shown in TABLE 11, these crosslinked pulps (2E, 2F) had even higher viscosity and R18 of >94%.

TABLE 11

Multi-dosing crosslinking

|  | Total crosslinker (wt. %) | CMC viscosity (cP) | R18 (%) |
|---|---|---|---|
| 2E | 15 | 582 | 94.3 |
| 2F | 25 | 452.8 | 94.1 |

Test Methods and Acronyms

About and Approximately refer to plus or minus 5% of the stated value.

Ash Content: Determined by TAPPI T 211 om-07.

ASTM: American Society for Testing and Materials

CMC: carboxymethyl cellulose

CLP: cotton linters pulp

Coefficient of Variability (COV): is defined as the ratio of the standard deviation to the mean.

Consistency: The consistency (C) of a pulp is determined by the dry weight ($W_d$) of a sample divided by the total weight ($W_t$) of a sample, expressed as a percentage. Consistency may be expressed as $C=(W_d/W_t)\times 100$. Consistency may be measured by TAPPI/ANSI T 240 am-12.

Crystallinity Index: Determined by the corresponding method of Lionetto et al., "Monitoring Wood Degradation during Weathering by Cellulose Crystallinity," Materials, 5, 1910-1922 (2012), which is incorporated herein by reference in its entirety.

Cuen Solubility: Solubility in cupriethylenediamine under the conditions of ASTM-D1795-96.

Curl Index: Determined by the corresponding method disclosed in U.S. Pat. No. 6,685,856, which is incorporated herein by reference in its entirety.

Degree of Polymerization: The number of D-glucose monomers in a cellulose molecule as measured by ASTM-D1795-96. Average degree of polymerization refers to the average number of D-glucose molecules per cellulose polymer in a population of cellulose polymers.

Degree of Substitution (DS): Determined by ASTM D 1439-03.

DWP: dissolving wood pulp

Hemicellulose Content: The sum of mannan and xylan content as determined by the method described in Examples 6 and 7 of U.S. Pat. No. 7,541,396, which is incorporated herein by reference in its entirety. This test is based on TAPPI T 249 cm00 with analysis by Dionex ion chromatography.

HPLC: High Performance Liquid Chromatography

ISO: International Organization for Standardization

Kink: Determined using a Valmet FS5 Fiber Image Analyzer.

Kink Angle: Determined using a Valmet FS5 Fiber Image Analyzer.

Kappa Number: Determined by ISO 302:2004.

MCA: monochloroacetic acid

Oven Dried (OD): Dried to less than or equal to 7% moisture by weight.

R18: Measured by TAPPI T 235 cm-00.

Resultant CMC Viscosity: Refers to the viscosity of a 0.5% solution of resultant CMC according to the Resultant CMC Testing Method described herein.

TAPPI: Technical Association of the Pulp and Paper Industry

Transition Metal Content: Determined by EPA SW-856 method 3050, 200.8.

EPA: United States Environmental Protection Agency

Water Retention Value (WRV): Determined by TAPPI T UM256M (2011).

While illustrative embodiments have been illustrated and described, it will be appreciated that various changes can be made therein without departing from the spirit and scope of the invention.

The embodiments of the invention in which an exclusive property or privilege is claimed are defined as follows:

1. A pulp comprising:
   crosslinked cellulose fibers, wherein the pulp has a pulp R18 value greater than or equal to 93%, and
   wherein the pulp has a water retention value (WRV) in a range of 0.8 g/g to less than 1.0 g/g.

2. The pulp according to claim 1, wherein the pulp includes hemicellulose at about 6 wt. % by dry mass or greater.

3. The pulp according to claim 1, wherein the pulp has a resultant carboxymethyl cellulose (CMC) viscosity of greater than 56 centipoise (cP).

4. The pulp according to claim 1, wherein the pulp has a resultant CMC viscosity in a range of about 100 cP to about 400 cP.

5. The pulp according to claim 1, wherein the pulp has a resultant CMC weight average molecular weight greater than about 800 kilodalton (kDa).

6. The pulp according to claim 1, wherein the pulp has a resultant CMC weight average molecular weight in a range of about 900 kDa to about 4,000 kDa.

7. The pulp according to claim 1, wherein the pulp R18 value is in a range of 93% to about 100%.

8. The pulp according to claim 1, wherein the pulp has a resultant CMC polydispersity index (PDI) of greater than or equal to about 3.

9. The pulp according to claim 1, wherein the crosslinked cellulose fibers include a glycidyl ether crosslinker having two or more glycidyl groups.

10. The pulp according to claim 1, wherein the pulp includes hemicellulose in a range from about 6 wt. % by dry mass to about 30 wt. % by dry mass.

11. The pulp according to claim 1, wherein the pulp is a kraft pulp.

12. The pulp according to claim 1, wherein the pulp is a straw pulp.

13. The pulp according to claim 1, wherein the pulp is a cotton linters pulp.

* * * * *